United States Patent
Nguyen

(10) Patent No.: US 6,600,355 B1
(45) Date of Patent: Jul. 29, 2003

(54) CLOCK GENERATOR CIRCUIT PROVIDING AN OUTPUT CLOCK SIGNAL FROM PHASED INPUT CLOCK SIGNALS

(75) Inventor: Andy T. Nguyen, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 10/166,908

(22) Filed: Jun. 10, 2002

(51) Int. Cl.[7] .................................................. G06F 1/04
(52) U.S. Cl. ........................ 327/298; 327/99; 327/166; 327/407; 365/233
(58) Field of Search ........................ 327/291, 293–298, 327/144, 146, 147, 150–153, 155, 156, 159–163, 165, 166, 99, 407; 331/DIG. 2; 365/233, 233.5; 375/371, 376

(56) References Cited

U.S. PATENT DOCUMENTS 5,604,452 A * 2/1997 Huang .......................... 327/99
5,646,558 A * 7/1997 Jamshidi ..................... 326/106
RE36,443 E * 12/1999 Ma et al. ...................... 326/39
6,373,308 B1   4/2002 Nguyen ....................... 327/161
6,477,186 B1 * 11/2002 Nakura et al. ............... 370/537

* cited by examiner

Primary Examiner—Timothy P. Callahan
Assistant Examiner—Minh Nguyen
(74) Attorney, Agent, or Firm—Lois D. Cartier

(57) ABSTRACT

A clock generator circuit accepts phased input clock signals having an input clock frequency, and generates from the phased signals an output clock signal having low jitter and a clock frequency created by dividing or multiplying the input clock frequency. In exemplary embodiments having four phased input signals and a duty cycle correction feature, a clock generator circuit provides output clock frequencies of the input clock frequency divided by X/2, where X is an integer. In other embodiments not having duty cycle correction, a clock generator circuit provides output clock frequencies of the input clock frequency divided by X/4. The delay through the clock generator circuit is minimal, and is independent of the divisor. Variations include programmable divisors and multipliers and optional phase shifting.

29 Claims, 20 Drawing Sheets

CLOCK GENERATOR CIRCUIT PROVIDING AN OUTPUT CLOCK SIGNAL FROM PHASED INPUT CLOCK SIGNALS

FIELD OF THE INVENTION

The invention relates to clock generator circuits. More particularly, the invention relates to a clock generator circuit that accepts phased input clock signals and provides from the phased input signals an output clock signal having low jitter and minimal delay.

BACKGROUND OF THE INVENTION

Clock signals are used in virtually every digital integrated circuit (IC) and electronic system to control timing. For example, whenever there is a rising edge on a clock signal, all the flip-flops in a circuit may change state. Clearly, the higher the frequency of the clock signal, the faster the circuit operates. Therefore, much attention has been given to achieving the highest possible clock speeds that can be supported by the clock circuitry.

One problem that typically develops when high-frequency clocks are used is the problem of "clock skew". Clock skew occurs when a clock signal is routed to two or more destinations and, because of varying delays on the clock paths, arrives at the targeted destinations at different times. For example, clock skew can occur when a clock signal is provided to the output pads and also to the internal circuitry of an IC. There might be, for example, a shorter delay in routing the clock signal to the output pads than there is in routing the clock signal to the internal circuitry. In this example, if the internal circuitry is driving the output pads, the clock skew can cause data errors.

A delay-lock loop (DLL) is often used to remove clock skew. A DLL corrects the difference in timing between two skewed clock signals by adding a delay to the slower path. The added delay is the additional delay required to give the slower path exactly one clock period more delay than the faster path. Thus, the two active edges arriving at the two target destinations are aligned, with one clock period of delay between the two clock signals.

DLLs are well known in the art of digital IC design. For example, one DLL is described by Nguyen in U.S. Pat. No. 6,373,308, entitled "Direct-Measured DLL Circuit and Method," which is hereby incorporated by reference.

A typical DLL continuously monitors the relative delay between a feedback clock signal and an input (or reference) clock signal, adding an additional unit delay to the output clock signal when the feedback clock is too fast and subtracting a unit delay when the feedback clock is too slow.

Many DLLs provide phased output signals. For example, a DLL can provide both the original delayed clock signal and three other clock signals delayed by one-fourth, one-half, and three-fourths of a clock period from the original delayed clock signal.

Some DLLs also include clock generator circuits that provide other output clock signals. These output signals can include, for example, a 2× clock having a clock frequency twice that of the input clock signal, or a divided clock signal having a clock frequency lower than that of the input clock signal. Divided clock signals can have, for example, clock frequencies divided by 1.5, 2.0, 2.5, 3.0, and so forth.

These output clock signals are typically generated by ring oscillators, and thus are subject to "jitter" (noise) caused by variations in temperature and/or power supply voltage. A feedback clock that includes jitter can cause a DLL to continuously adjust the number of unit delays on the clock path. These adjustments by the DLL themselves cause additional jitter on the clock signals provided by the DLL. Therefore, the DLL and oscillators form a system having a positive feedback loop in which the jitter can take a long time to settle down.

A conventional DLL reduces jitter by first pumping the power supply of the DLL to a higher level than the operating voltage, then regulating the power supply to minimize the effect of variations in IC power supply and temperature. Often, a large capacitor is also applied between the DLL power supply and ground. However, these methods are expensive in IC area and design complexity. Hence, they add significant cost to the final IC product and considerable time to the product development cycle.

Therefore, it is desirable to provide a clock generator circuit that can generate divided and/or multiplied clock signals having little or no jitter. It is further desirable to provide a clock generator circuit with minimal delay through the circuit.

SUMMARY OF THE INVENTION

The invention provides a clock generator circuit that accepts phased input clock signals having an input clock frequency, and generates from the phased signals an output clock signal having low jitter and a clock frequency created by dividing or multiplying the input clock frequency. In exemplary embodiments having four phased input signals and a duty cycle correction feature, the invention provides output clock frequencies of the input clock frequency divided by X/2, where X is an integer. In other embodiments not having duty cycle correction, the invention provides output clock frequencies of the input clock frequency divided by X/4. The delay through the clock generator circuit is less that that of known circuits, and is independent of the divisor.

In some embodiments, the output clock signal is shifted by 90, 180, or 270 degrees (one fourth, one half, or three quarters of a clock period) from the input clock signal. Other embodiments are programmable to provide various divisors and multipliers.

While the circuits of the invention can be used with phased input signals from any source, the circuit is particularly useful in conjunction with a delay-lock loop (DLL). In this context, the reduced jitter of the circuit of the invention provides a valuable advantage over known clock generator circuits, as it facilitates fast locking of the DLL. For example, in a programmable logic device (PLD), a programmable clock generator circuit according to the invention can be included in a DLL to provide a high level of versatility combined with fast locking capability.

A first embodiment of the invention provides a clock generator circuit comprising a state machine, a NOR circuit, a multiplexer, and a pulldown circuit. The state machine is driven by one of two or more phased input clock signals, and provides clock select signals to control the multiplexer circuit. The multiplexer circuit selects one of the phased input signals to pass to the output terminal of the clock generator. The clock select signals are also NORed together in the NOR circuit, and the output of the NOR circuit drives a pulldown on the output terminal.

Another embodiment includes two of the circuits described above, having two different state machines. One of the state machines provides a "set" signal that drives the output clock signal high, while the other state machine provides a "reset" signal that drives the output clock signal low. A "keeper circuit" on the output terminal holds the output high after a set signal is received, and low after a reset signal is received. Thus, this embodiment provides duty cycle correction on the output clock signal.

Some embodiments of the invention are programmable. One such embodiment uses four phased input signals and includes a decoder circuit that decodes user code signals selecting a divisor from the group of 1.25, 1.5, 1.75, 7.75, 8. The decoder circuit provides control signals to the state machine that cause the state machine to implement the selected divisor. Another embodiment, which supports duty cycle correction and includes two state machines, permits a user to select a divisor from the group of 1.5, 2, 2.5, . . . , 7.5, 8. In this embodiment, each state machine can have its own decoder circuit, or the set and reset decoder circuits can be combined into a single decoder circuit.

BRIEF DESCRIPTION OF THE DRAWINGS

The present invention is illustrated by way of example, and not by way of limitation, in the following figures.

FIG. 7A shows the circuitry for generating the clock select signal S0.

FIG. 7B shows the circuitry for generating the clock select signals S90, S180, and S270.

FIG. 9A shows the circuitry for generating the clock select signal S0.

FIG. 9B shows the circuitry for generating the clock select signals S90, S180, and S270.

FIG. 10A shows the circuitry for generating the clock select signal R0.

FIG. 10B shows the circuitry for generating the clock select signal R90.

FIG. 10C shows the circuitry for generating the clock select signals R180 and R270.

DETAILED DESCRIPTION OF THE DRAWINGS

In the following description, numerous specific details are set forth to provide a more thorough understanding of the present invention. However, it will be apparent to one skilled in the art that the present invention may be practiced without these specific details.

For example, the exemplary clock generator circuits shown in the figures are driven by four phased input clock signals separated by 90 degrees of offset. However, it will be apparent to those of skill in the art upon familiarity with the present specification and drawings that the principles of the invention can also be applied to input clock signals having a different number of phases and a different offset. For example, eight phased input clock signals separated by 45 degrees could be used. Therefore, the invention is not limited to clock generator circuits driven by four or eight phased input clock signals.

Figure 1:
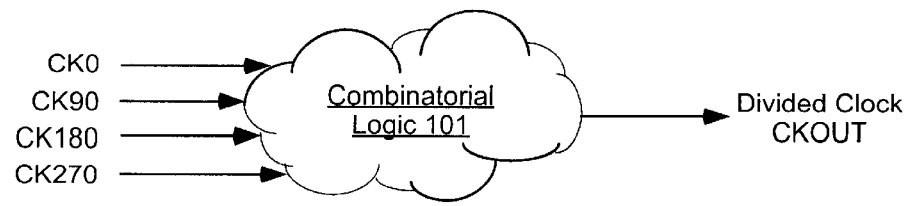
FIG. 1 illustrates a typical prior art clock generator circuit.

FIG. 1 illustrates the general nature of a conventional clock generator circuit. The input clock signals C0, CK90, C180, and CK270 are phased input signals separated by 90 degrees of offset. The phased input signals are combined in combinatorial logic 101 to provide an output clock signal CKOUT that can be, for example, a divided version of one of the input clock signals.

A disadvantage of this general approach is that there is significant delay through combinatorial logic 101. This delay becomes part of the clock path, contributing to the skew problem noted above. Further, if the combinatorial logic is made programmable, e.g., if a user can select one of a set of supported divisors, the delay through the combinatorial logic varies depending on the divisor selected.

Figure 2:
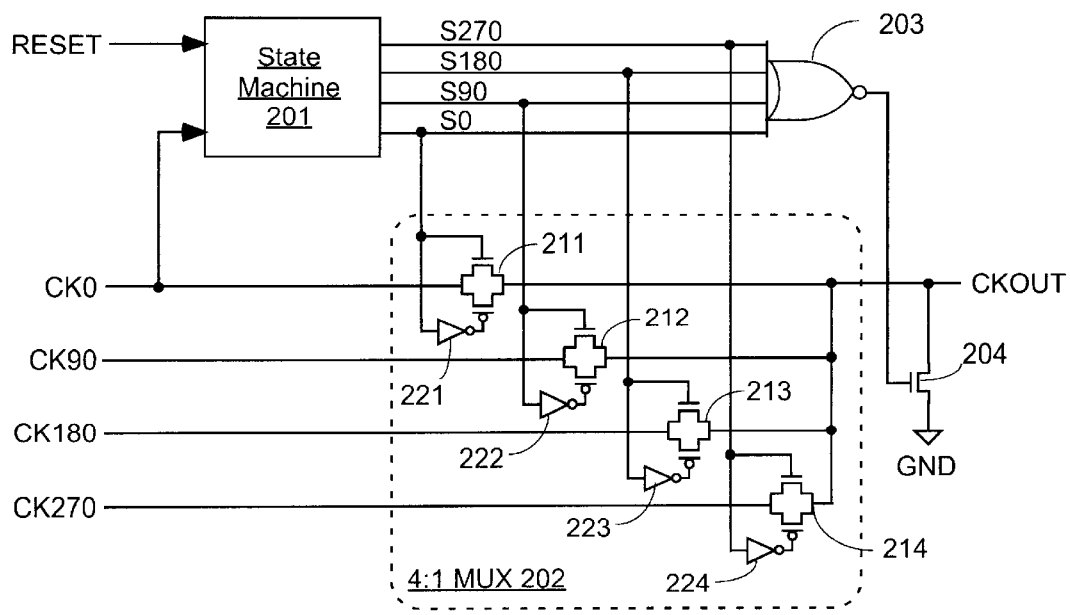
FIG. 2 shows a clock generator circuit according to one embodiment of the invention.

FIG. 2 shows a first clock generator circuit according to a first embodiment of the invention. The clock generator circuit of FIG. 2 includes a state machine circuit 201, a 4-to-1 multiplexer circuit 202, a logical NOR circuit 203, and a pulldown circuit 204.

State machine circuit 201 is driven by input clock signal CK0 and reset signal RESET, and provides clock select signals S0, S90, S180, and S270. (In the present specification, the same reference characters are used to refer to terminals, signal lines, and their corresponding signals.)

Clock select signals S0, S90, S180, and S270 are combined in logical NOR circuit 203, which controls pulldown circuit 204. Pulldown circuit 204 is coupled to the output terminal CKOUT of the clock generator circuit. 4-to-1 multiplexer circuit 202 has four data input terminals driven by the four phased input clock signals CK0, CK90, CK180, and CK270, four select input terminals driven by clock select signals S0, S90, S180, and S270, and an output terminal coupled to the output terminal CKOUT of the clock generator circuit.

In the pictured embodiment, logical NOR circuit 203 is implemented as a simple 4-input NOR gate. Pulldown circuit 204 is implemented as an N-channel transistor coupled between the circuit output node CKOUT and ground GND, with a gate terminal coupled to the output of the NOR gate. 4-to-1 multiplexer circuit 202 is implemented as four CMOS passgates, each coupled between an associated data input terminal and the multiplexer output terminal. The N-channel transistor of each passgate has a gate terminal coupled to the associated clock select terminal. The corresponding P-channel transistor of each passgate has a gate terminal coupled to an inverted version of that signal, inverted by inverters 221–224.

The clock generator circuit of FIG. 2 functions as follows. State machine circuit 201 accepts the "unphased" or "zero" input clock signal CK0, which drives a series of D flip-flops. The state machine output signals S0, S90, S180, and S270 follow a repeating pattern based on the design of the state machine. When signal S0 is high, a pulse on input terminal CK0 is passed through to output terminal CKOUT. When signal S90 is high, a pulse on input terminal CK90 is passed through to output terminal CKOUT. When signal S180 is high, a pulse on input terminal CK180 is passed through to output terminal CKOUT. Finally, when signal S270 is high, a pulse on input terminal CK270 is passed through to output terminal CKOUT. When all of signals S0, S90, S180, and S270 are low, logical NOR circuit 203 and pulldown circuit 204 pull output terminal CKOUT low.

Thus, by controlling which clock select signals are high, and when they are high, pulses on the various phased input clock signals are selectively passed to the output terminal of the clock generator circuit.

Note that the delay on the clock path through the clock generator circuit has been reduced to the delay through multiplexer circuit 202. For example, in the pictured embodiment, the delay is the delay through one CMOS passgate. Most of the delay has been removed to a separate control circuit, state machine circuit 201. This removal provides a substantial advantage to the circuits of the invention as compared to known clock generator circuits.

Figure 3:
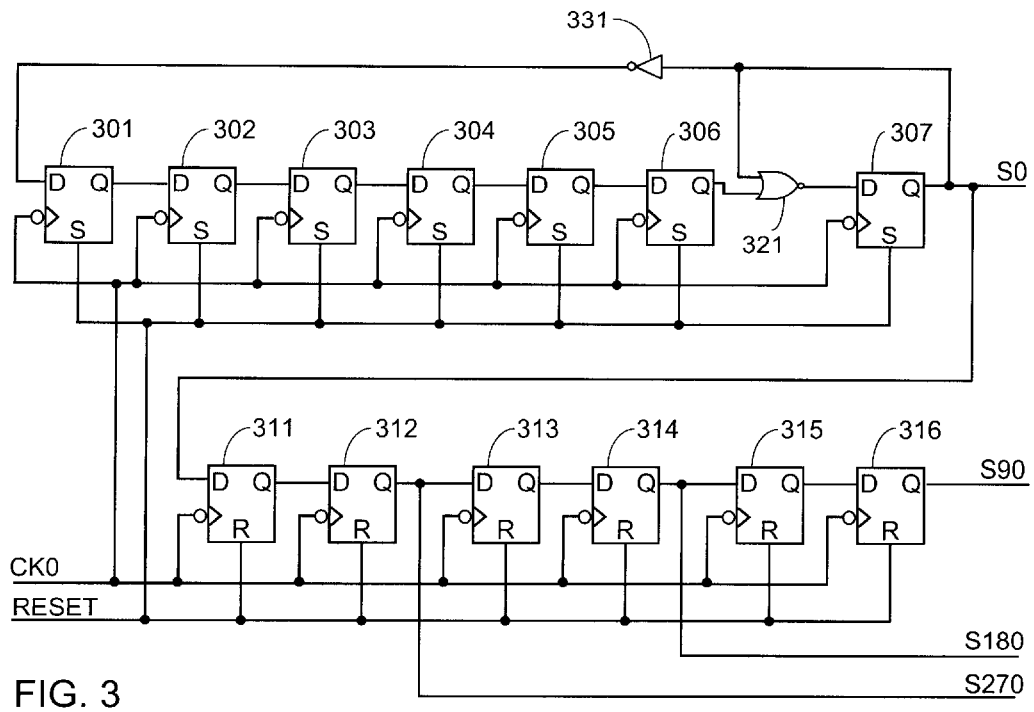
FIG. 3 shows an exemplary state machine that can be used with the embodiment of FIG. 2 to divide a clock signal by 1.75.
Figure 3A:
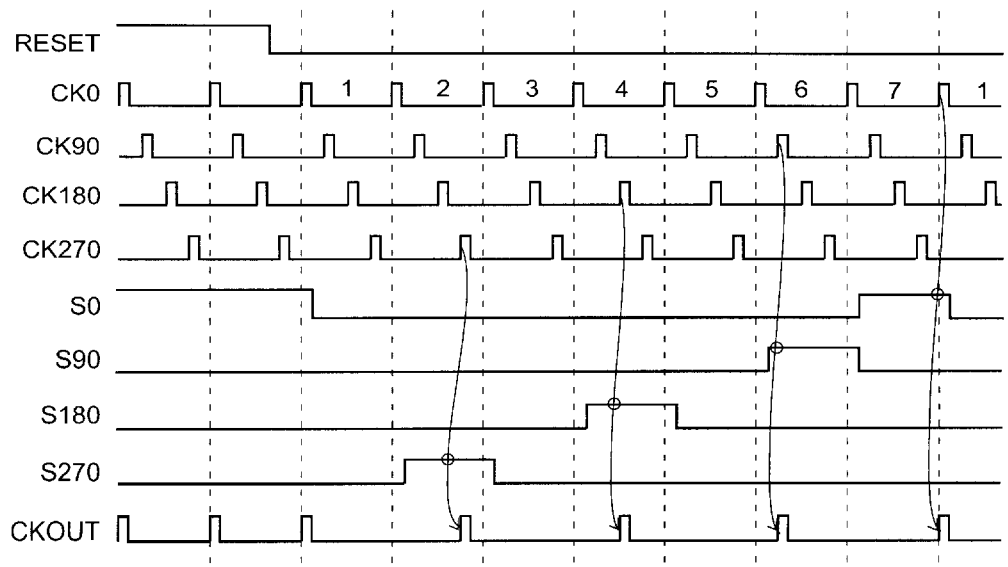
FIG. 3A shows the waveforms that result when the state machine of FIG. 3 is used with the embodiment of FIG. 2.

The functionality of the clock generation circuit of FIG. 2 is best understood by examining various embodiments of the invention in detail. FIG. 3 shows a state machine that can be used in the circuit of FIG. 2 to provide a first such embodiment, in which the frequency of the input clock signals is divided by a factor of 1.75. FIG. 3A shows the input and output waveforms that result from this first embodiment.

The state machine of FIG. 3 includes set flip-flops 301–307, reset flip-flops 311–316, NOR gate 321, and inverter 331. The set or reset terminal of each flip-flop is driven by reset signal RESET, and all are clocked by a falling edge on input clock signal CK0 (as indicated by the bubble on the triangle that designates the clock input terminal).

Set flip-flops 301–306 are coupled in series, with the output Q of each flip-flop driving the input D of the next flip-flop in the series. The output Q of flip-flop 306 drives NOR gate 321 along with signal SO. NOR gate 321 drives the input D of flip-flop 307, which in turn provides clock select output signal S0. Signal S0 also drives inverter 331, which provides the input D of flip-flop 301.

Reset flip-flops 311–316 are also coupled in series. The output Q of flip-flop 312 provides clock select output signal S270. The output Q of flip-flop 314 provides clock select output signal S180. The output Q of flip-flop 316 provides clock select output signal S90.

Therefore, as can be seen in FIG. 3A, when the reset signal RESET is high, flip-flops 301–307 are set, so signal S0 is high. Flip-flops 311–316 are reset, so signals S270, S180, and S90 are all low. As can be seen in FIG. 2, when signal S0 is high, the CK0 input clock signal is passed to the output terminal CKOUT. Thus, CKOUT follows CK0, as can be seen in FIG. 3A.

After RESET goes low, at the next falling edge of signal CK0, signal S0 goes low. The loop through flip-flops 301–307 then causes signal S0 to go high again six clock periods later for one period of signal CK0, and repeat every seven CK0 periods. This repeating pattern is indicated in FIG. 3A as CK0 clock periods numbered from "1" to "7".

Signal S270 is delayed from signal S0 by two clock periods, so goes high in period 2. Signal S180 is delayed from signal S270 by two additional clock periods, so goes high in period 4. Signal S90 is delayed from signal S180 by two more clock periods, so is high in period 6. In period 7, signal S0 goes high again.

Referring now to FIGS. 2 and 3A, in period 2 a high pulse occurs on clock select signal S270. Thus, the high pulse on input signal CK270 is passed to signal CKOUT, as shown by the arrow in FIG. 3A. Similarly, in period 4 a high pulse occurs on signal S180, and a pulse on input signal CK180 is passed to signal CKOUT. In period 6, a high pulse occurs on signal S180, and a pulse on input signal CK180 is passed to signal CKOUT. In period 7, a high pulse occurs on signal S0, and a pulse on input signal CK0 occurring at the beginning of the next period 1 is passed to signal CKOUT. This pattern repeats until the clock generator circuit is again reset.

As can be seen from FIG. 3A, the output clock signal CKOUT has a clock frequency divided by a factor of 1.75 from the input clock frequency. The number 1.75 is seven (the number of flip-flops in the feedback loop of flip-flops 301–307 in FIG. 3) divided by four (the number of phased input clock signals). With four phased input clock signals and an appropriately designed state machine, divisors that can be implemented using the circuit of the FIG. 2 include X/4, where X is any positive integer. If eight phased input clock signals were provided, supported divisors would include X/8. With two phased input clock signals, supported divisors include X/2, and so forth.

Figure 4:
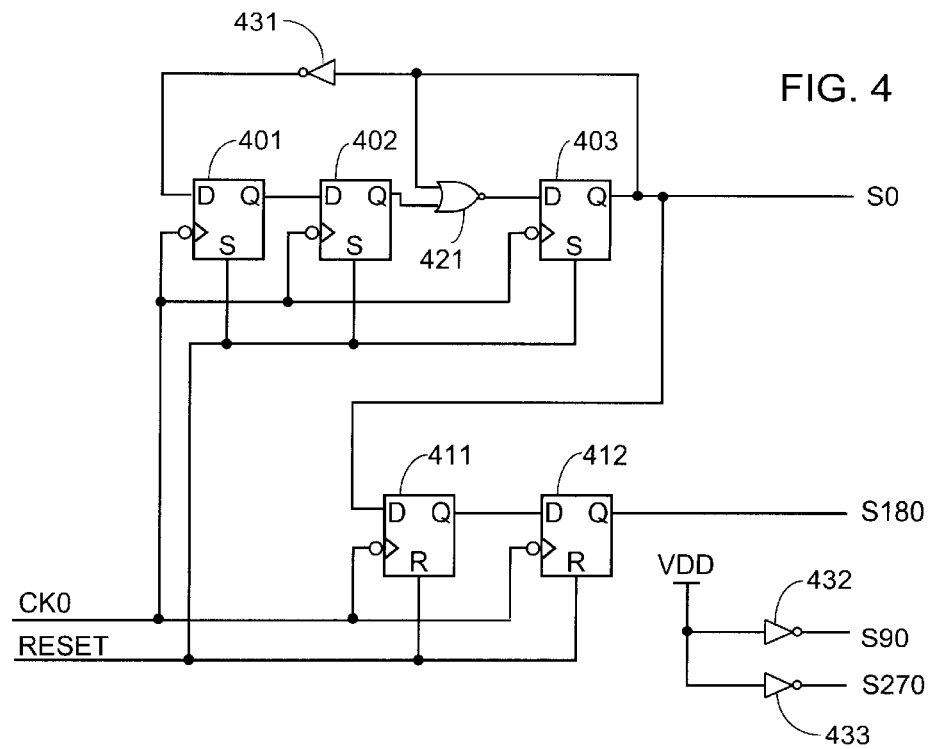
FIG. 4 shows an exemplary state machine that can be used with the embodiment of FIG. 2 to divide a clock signal by 1.5.
Figure 4A:
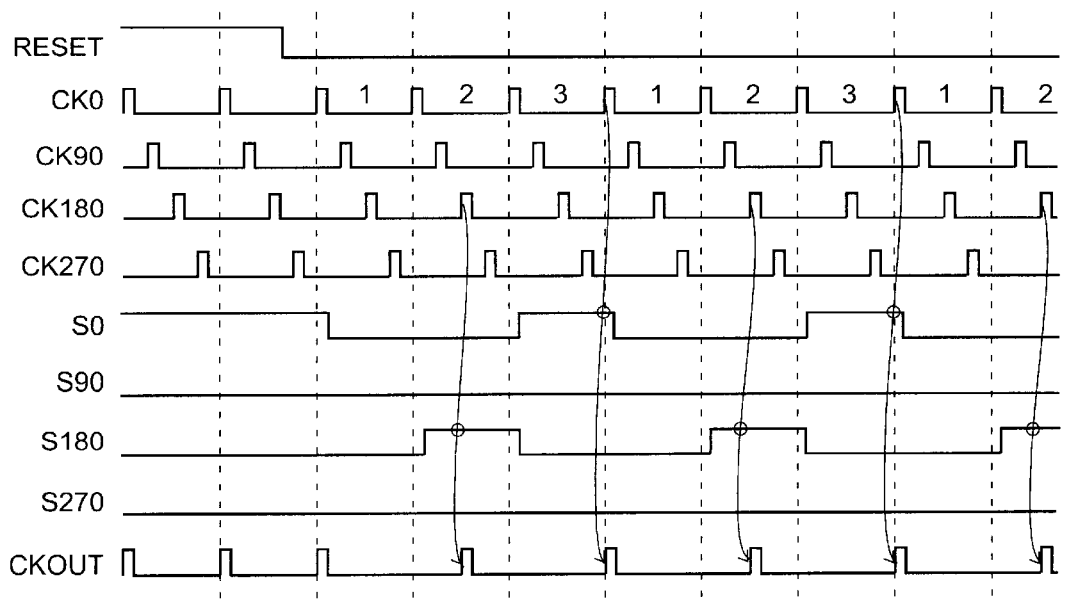
FIG. 4A shows the waveforms that result when the state machine of FIG. 4 is used with the embodiment of FIG. 2.

FIG. 4 shows another state machine that can be used in the circuit of FIG. 2 to provide a second embodiment of the invention, in which the frequency of the input clock signals is divided by a factor of 1.5. FIG. 4A shows the input and output waveforms that result from this second embodiment. It is clear from FIG. 4A that this embodiment does not require phased input signals S90 and S270. Therefore, with two phased input signals CK0 and CK180, a divisor of 3/2 is implemented using the circuit of FIG. 2 and the state machine of FIG. 4.

The state machine of FIG. 4 includes set flip-flops 401–403, reset flip-flops 411–412, NOR gate 421, and inverters 431–433. The set or reset terminal of each flip-flop is driven by reset signal RESET, and all are clocked by a falling edge on input clock signal CK0 (as indicated by the bubble on the triangle that designates the clock input terminal).

Set flip-flops 401–402 are coupled in series. The output Q of flip-flop 402 drives NOR gate 421 along with signal S0. NOR gate 421 drives the input D of flip-flop 403, which in turn provides clock select output signal S0. Signal S0 also drives inverter 431, which provides the input D of flip-flop 401.

Reset flip-flops 411–412 are also coupled in series. The output Q of flip-flop 412 provides clock select output signal S180. Clock select output signal S90 is always low, driven by power high VDD through inverter 432. Clock select output signal S270 is also always low, driven by power high VDD through inverter 433.

Therefore, as can be seen in FIG. 4A, when the reset signal RESET is high, flip-flops 401–403 are set, so signal S0 is high. Flip-flops 411–412 are reset, so signal S180 is low. As can be seen in FIG. 2, when signal S0 is high, the CK0 input clock signal is passed to the output terminal CKOUT. Thus, CKOUT follows CK0, as can be seen in FIG. 4A.

After RESET goes low, at the next falling edge of signal CK0, signal S0 goes low. The loop through flip-flops 401–403 then causes signal S0 to go high again two clock periods later for one period of signal CK0, and repeat every three CK0 periods. This repeating pattern is indicated in FIG. 4A as CK0 clock periods numbered from "1" to "3".

Signal S180 is delayed from signal S0 by two clock periods, so goes high in period 2. In period 3, signal S0 goes high again.

Referring now to FIGS. 2 and 4A, in period 2 a high pulse occurs on clock select signal S180. Thus, the high pulse on input signal CK180 is passed to signal CKOUT, as shown by the arrow in FIG. 4A. In period 3, a high pulse occurs on signal S0, and a pulse on input signal CK0 occurring at the beginning of the next period 1 is passed to signal CKOUT. This pattern repeats until the clock generator circuit is again reset.

The state machine of FIG. 4 uses only two of the four available phased input clock signals and provides a divisor of 3/2. Where a reduced resolution is acceptable for the divisor, an additional capability can be provided, as shown in the next exemplary clock generator circuit.

Figure 5:
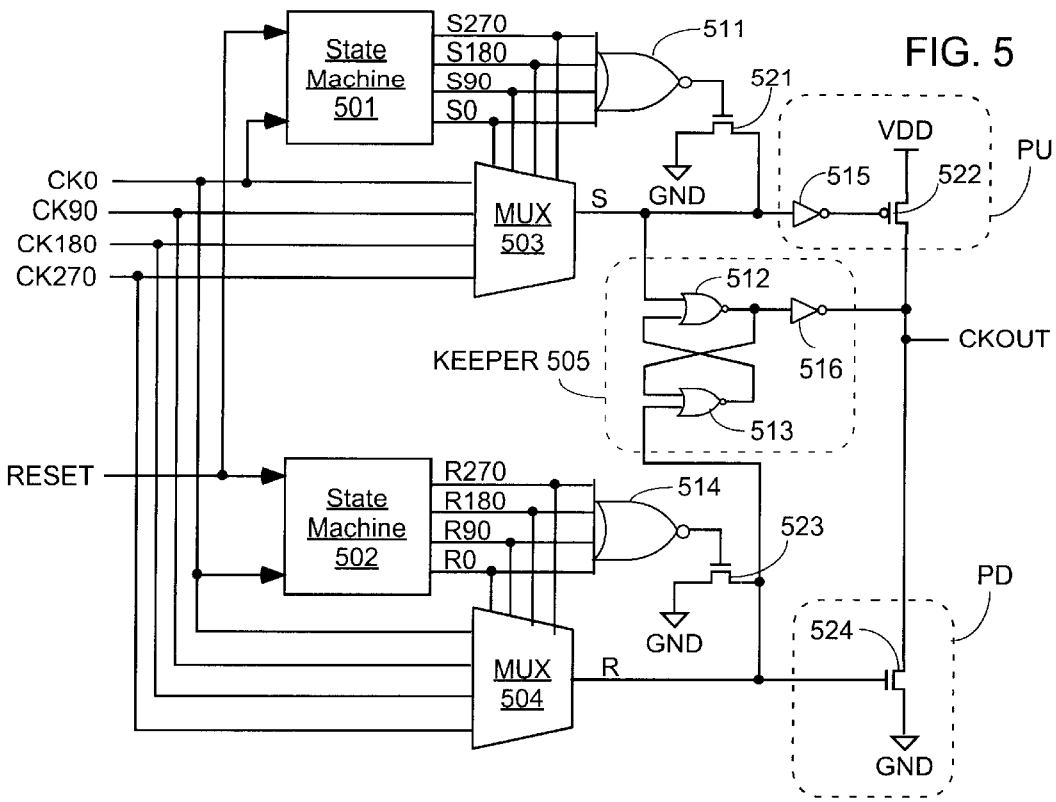
FIG. 5 shows a clock generator circuit having duty cycle correction according to another embodiment of the invention.

FIG. 5 shows a clock generator circuit having a duty cycle correction capability, according to another embodiment of the invention. Two circuits similar to that of FIG. 2 are provided. One circuit (the "set" circuit) is used to provide the rising edges of the output clock CKOUT. The other circuit (the "reset" circuit) is used to provide the falling edges of signal CKOUT.

The clock generator circuit of FIG. 5 includes state machine circuits 501 and 502, 4-to-1 multiplexer circuits 503 and 504, logical NOR circuits 511 and 514, pulldown circuits 521, 523, and PD, keeper circuit 505, and pullup circuit PU.

State machine circuit 501, 4-to-1 multiplexer circuit 503, logical NOR circuit 511, and pulldown circuit 521 together form a circuit similar to that of FIG. 2 and having an output node S. Similarly, state machine circuit 502, 4-to-1 multiplexer circuit 504, logical NOR circuit 514, and pulldown circuit 523 together form a circuit similar to that of FIG. 2 and having an output node R.

Node S controls pullup circuit PU. In the pictured embodiment, pullup circuit PU is implemented as an inverter 515 driving a P-channel transistor coupled between VDD (power high) and output terminal CKOUT. Node R controls pulldown circuit PD. In the pictured embodiment, pulldown circuit PD is implemented as an N-channel transistor 524 coupled between output terminal CKOUT and ground (GND) and having a gate terminal coupled to node R. In other embodiments, pullup circuit PU and pulldown circuit PD are implemented using other elements and/or other interconnections between the elements.

Keeper circuit 505 has a set terminal coupled to node S and a reset terminal coupled to node R. The output terminal of keeper circuit 505 is coupled to the output terminal CKOUT of the clock generator circuit.

In the pictured embodiment, keeper circuit 505 is implemented as a set-reset latch. NOR gates 512 and 513 are cross-coupled. Node S also drives NOR gate 512, and node R also drives NOR gate 513. NOR gate 512 also drives inverter 516, which provides the keeper output signal to output CKOUT of the clock generator circuit. In other embodiments, keeper circuit 505 is implemented using other elements and/or other interconnections between the elements. For example, keeper circuit 505 can be implemented using cross-coupled NAND gates or cross-coupled inverters. In the inverter implementation, no set and reset inputs are required to the keeper circuit.

The clock generator circuit of FIG. 5 functions as follows. State machine 501 places selected pulses from phased input clock signals CK0, CK90, C180, and C270 onto node S. State machine 502 places other selected pulses from phased input clock signals CK0, CK90, C180, and C270 onto node R. The pulses selected by the two state machines are 180 degrees out of phase. When node S goes high, pullup circuit PU turns on and output signal CKOUT goes high. The high value on node S also sets keeper circuit 505, which maintains the high value on output signal CKOUT after the pulse on node S goes away. When node R goes high, pulldown circuit PD turns on, and output signal CKOUT goes low. The high value on node R also resets keeper circuit 505, which maintains the low value on output signal CKOUT after the pulse on node R goes away.

When reset signal RESET is high, node S follows signal CK0, as described in conjunction with FIGS. 3A and 2. State machine 502 is designed such that node R follows signal CK180 when RESET is high. Thus, when RESET is high, output signal CKOUT goes high when signal CK0 goes high, and goes low half a clock period (180 degrees) later. In other words, the output clock signal CKOUT is a duty-cycle corrected version of input signal CK0.

Figure 5A:
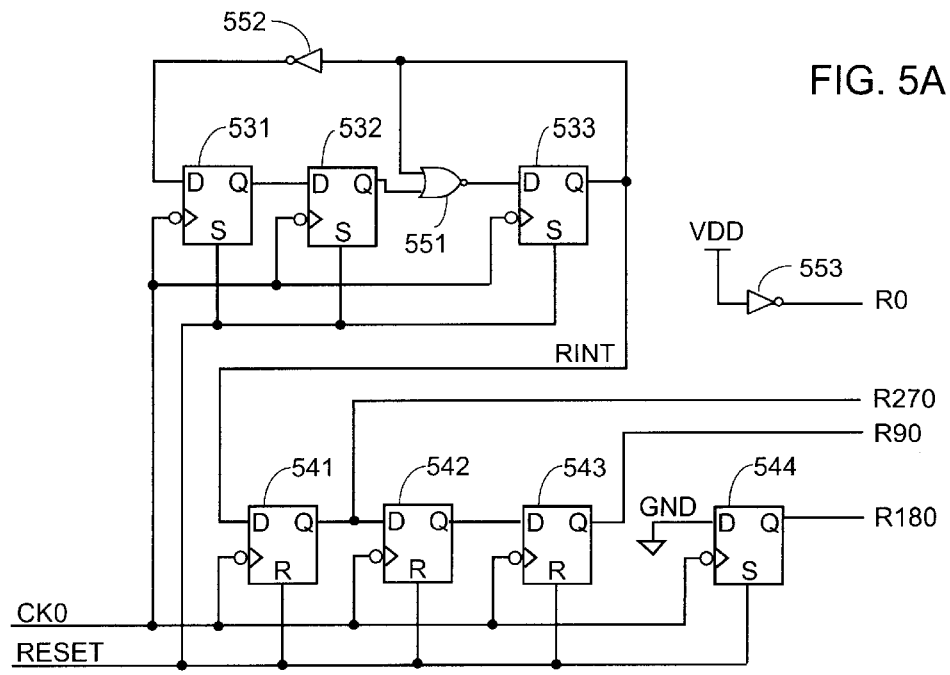
FIG. 5A shows a "reset" state machine that can be used with the embodiment of FIG. 5, with the state machine of FIG. 4 being used as the "set" state machine.
Figure 5B:
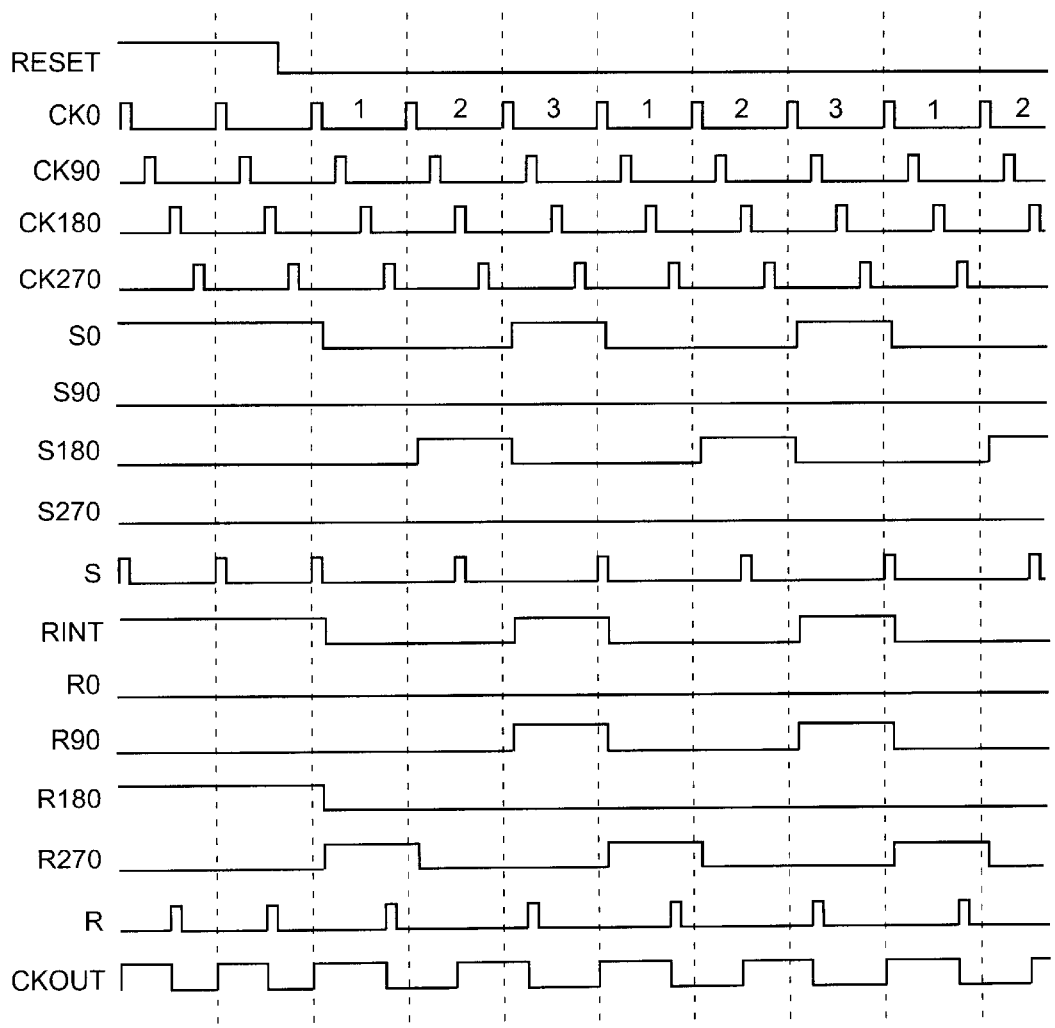
FIG. 5B shows the waveforms that result when the state machines of FIGS. 5A and 4 are used with the embodiment of FIG. 5.

A specific implementation of the circuit of FIG. 5 is now provided. In this example, the clock frequency is divided by 1.5 and includes a duty cycle correction. The set state machine 501 is the same as the state machine shown in FIG. 4. The reset state machine 502 is shown in FIG. 5A. The input and output waveforms for this example are shown in FIG. 5B.

The reset state machine of FIG. 5A includes set flip-flops 531–533 and 544, reset flip-flops 541–543, NOR gate 551, and inverters 552–553. The set or reset terminal of each flip-flop is driven by reset signal RESET, and all are clocked by a falling edge on input clock signal CK0.

Set flip-flops 531–532 are coupled in series. The output Q of flip-flop 532 drives NOR gate 551 along with internal signal RINT. NOR gate 551 drives the input D of flip-flop 533, which in turn provides signal RINT. Signal RINT also drives inverter 552, which provides the input D of flip-flop 531.

Reset flip-flops 541–543 are also coupled in series. The output Q of flip-flop 541 provides clock select output signal R270. The output Q of flip-flop 543 provides clock select output signal R90. Clock select output signal R0 is always low, driven by power high VDD through inverter 553. Clock select output signal R180 is provided by the output Q of set flip-flop 544, which has an input D driven by ground GND.

Therefore, as can be seen in FIG. 5B, when the reset signal RESET is high, flip-flops 531–533 are set, so signal RINT is high. Flip-flops 541–544 are reset, so signals R270 and R90 are low. Flip-flop 544 is set, so signal R180 is high. When signal R180 is high the CK180 input clock signal is passed to node R of FIG. 5.

Thus, as shown in FIG. 5B, when reset signal RESET is high node S follows CK0 and node R follows CK180. A rising edge on node S causes output signal CKOUT to go high, and a falling edge on node R causes output signal CKOUT to go low.

Returning to FIG. 5A, after RESET goes low, at the next falling edge of CK0 signal R180 goes low, and remains low until the circuit is again reset. At the same time, signal RINT goes low. The loop through flip-flops 531–533 then causes signal RINT to go high again two clock periods later for one period of signal CK0, and repeat every three CK0 periods. This repeating pattern is indicated in FIG. 5B as CK0 clock periods numbered from "1" to "3".

Also after RESET goes low, at the next falling edge of CK0 signal R270 goes high for one CK0 clock period. (Signal R270 is delayed from internal signal RINT by one clock period.) Signal R90 is delayed from signal R270 by two clock periods, so goes high in period 3. Also in period 3, signal RINT goes high again.

Referring now to FIGS. 5 and 5B, in period 1 a high pulse occurs on clock select signal R270. Thus, the high pulse on input signal CK270 is passed to signal R, and output signal CKOUT goes low. Keeper circuit 505 maintains the low value on signal CKOUT until the next rising edge on signal S. In period 2, a high pulse occurs on clock select signal S180. Thus, the high pulse on input signal CK180 is passed to signal S, and output signal CKOUT goes high in the middle of period 2.

In period 3, a high pulse occurs on clock select signal R90. Thus, the high pulse on input signal CK90 is passed to signal R, and output signal CKOUT goes low again. Also in period 3, a high pulse occurs on clock select signal S0. Thus, the high pulse on input signal CK0 occurring at the beginning of the next period 1 is passed to signal S, and output signal CKOUT goes high again.

This pattern repeats until the clock generator circuit of FIG. 5 is again reset.

Figure 6:
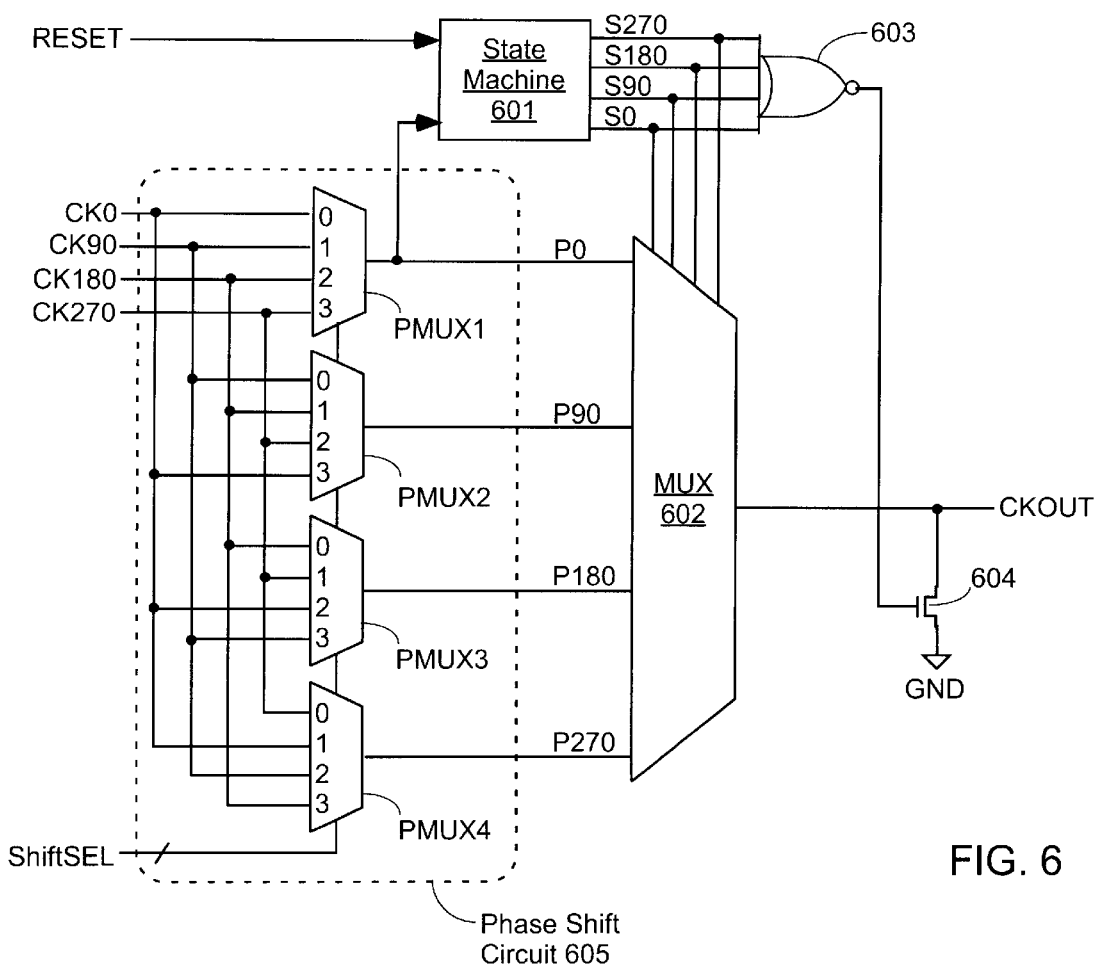
FIG. 6 shows a clock generator circuit having phase shift capability according to another embodiment of the invention.

FIG. 6 illustrates another optional feature of the clock generator circuit of the present invention, a phase shifting capability. The embodiment of FIG. 6 includes a phase shift circuit 605 on the input clock path. Phase shift circuit 605 includes four 4-to-1 multiplexers PMUX1–PMUX4 coupled between phased input clock terminals CK0, CK90, CK180, and CK270 and the rest of the circuit.

Shift select input signals ShiftSEL control multiplexers PMUX1–PMUX4 to select signals shifted 0, 90, 180, or 270 degrees from the input signals CK0, CK90, CK180, and CK270. The shifted clock signals P0, P90, P180, and P270 are provided to state machine circuit 601 and multiplexer circuit 602 as the phase shifted input signals.

The other elements of FIG. 6 can be similar to those of any other embodiment of the invention. In the pictured embodiment, phase shift circuit 605 is added to a clock generator circuit similar to that shown in FIG. 2.

Figure 6A:
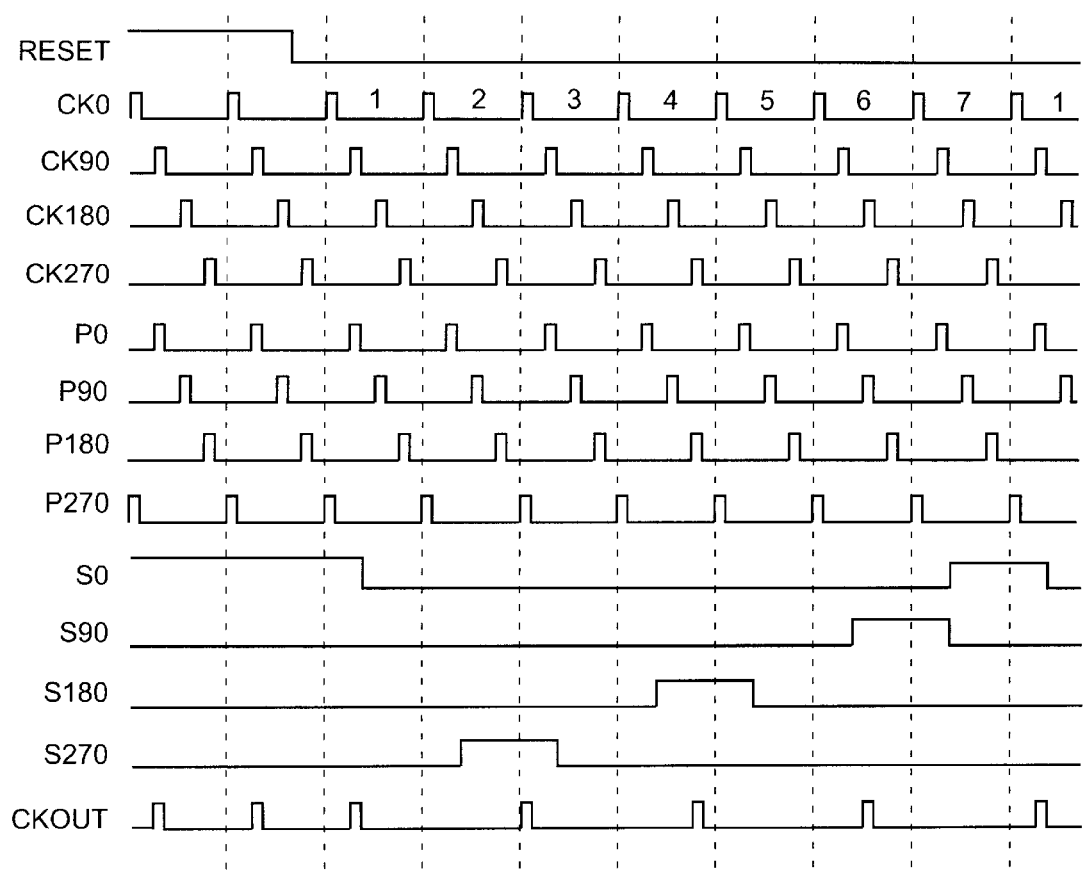
FIG. 6A shows the waveforms that result when the state machine of FIG. 3 is used with the embodiment of FIG. 6 and the output is shifted by 90 degrees.

FIG. 6A shows the input and output waveforms for the clock generator circuit of FIG. 6 in the case where a phase shift of 90 degrees is selected. In other words, signals ShiftSEL are selected such that input "1" is selected for each of multiplexers PMUX1–PMUX4. In this embodiment, signals P0, P90, P180, and P270 follow signals C90, CK180, CK270, and C0, respectively. For simplicity, the state machine shown in FIG. 3 is used, i.e., a divisor of 1.75 is selected.

Signals RESET, CK0, CK90, CK180, and CK270 are the same as those shown in FIG. 3A. After a shift of 90 degrees is applied using phase shift circuit 605, shifted clock signals P0, P90, P180, and P270 are as shown in FIG. 6A. Shifted clock signal P0 clocks state machine circuit 601, rather than input clock signal CK0 as in the embodiment of FIG. 2. Therefore, the clock select signals S0, S90, S180, and S270 are shifted by 90 degrees from those shown in FIG. 3A.

Both the data and select inputs to multiplexer circuit 602 are shifted by 90 degrees compared to multiplexer circuit 202 of FIG. 2. Therefore, output clock signal CKOUT is similar to the output waveform shown in FIG. 3A, but is shifted by 90 degrees from that waveform.

Figure 7:
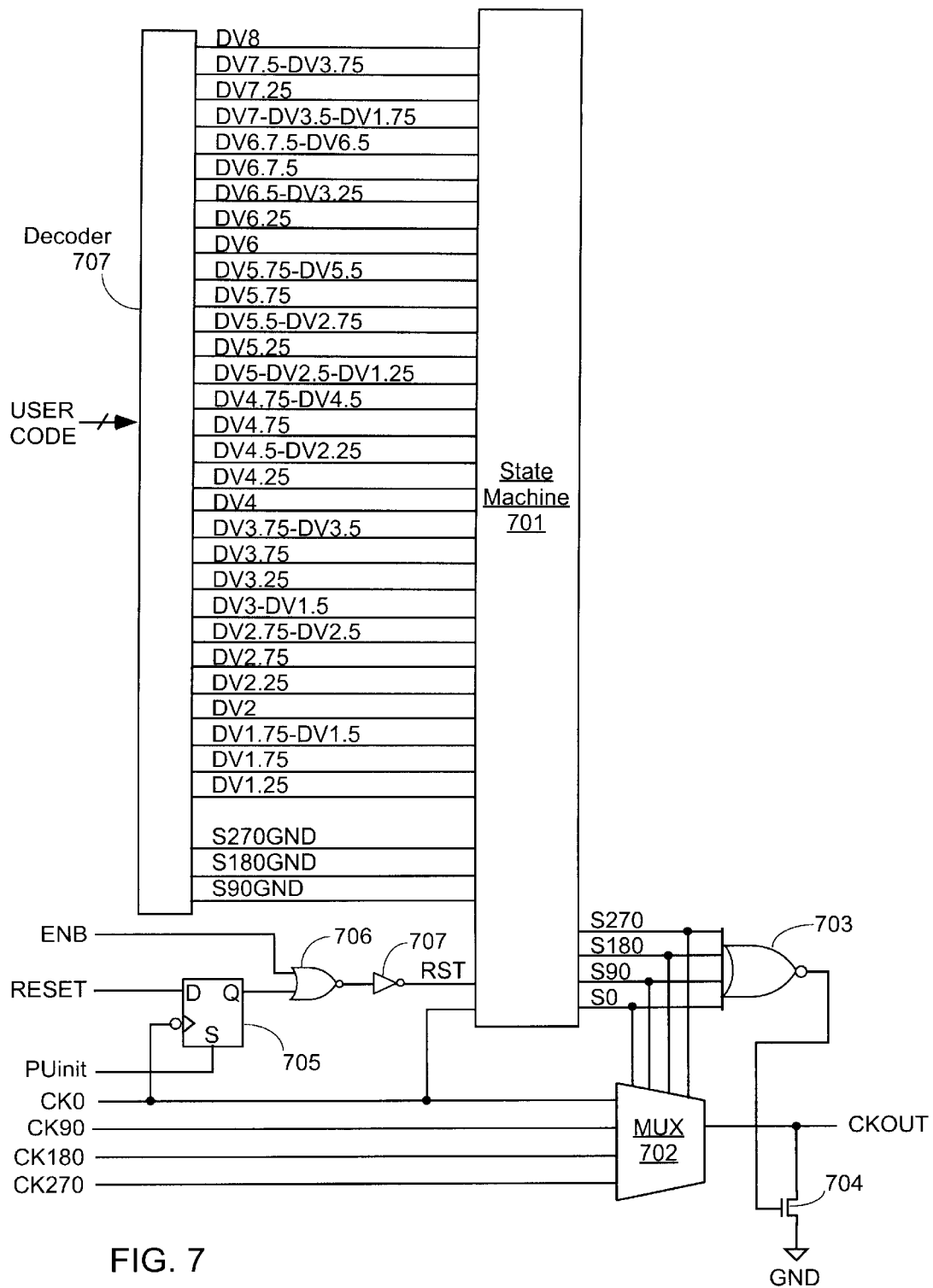
FIG. 7 shows a clock generator circuit having a programmable divisor according to another embodiment of the invention.

FIG. 7 provides an example of another optional capability that can be added to the clock generator circuit of the invention. The embodiment of FIG. 7 is programmable, having a user code that selects the divisor. In the pictured embodiment, the divisor can be any of the following: 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, and 8. A divisor of 1 is provided whenever the circuit is reset.

The circuit of FIG. 7 is purely exemplary. It will be clear to those of skill in the art that other programmable divisors and other numbers of divisors than those shown in this embodiment can easily be implemented following the principles of the invention described herein.

The clock generator circuit of FIG. 7 includes a decoder circuit 707, a state machine circuit 701, a 4-to-1 multiplexer circuit 702, a logical NOR circuit 703, a pulldown circuit 704, a set flip-flop 705, a NOR gate 706, and an inverter 707.

State machine circuit 701, 4-to-1 multiplexer circuit 702, logical NOR circuit 703, and pulldown circuit 704 together form a circuit similar to that of FIG. 2. However, the embodiment of FIG. 7 also includes decoder circuit 707, which is controlled by a user code to generate several control signals that drive state machine circuit 701. These control signals determine the divisor for the circuit.

The embodiment of FIG. 7 also includes additional reset circuitry providing both synchronous and asynchronous reset capability. Set flip-flop 705 synchronizes reset signal RESET to clock input CK0, and is initialized to a high value during device power-up by a high value on initialization signal PUinit. In some embodiments, enable signal ENB is a static value stored, for example, as PLD configuration data in an SRAM or FLASH memory cell. However, in other embodiments enable signal ENB is a dynamic value controllable by the user. In these embodiments, enable signal ENB can also be used as an asynchronous reset. Enable signal ENB and flip-flop 705 both drive NOR gate 705, which drives inverter 707, which in turn drives signal RST in state machine circuit 701. Thus, a high signal on input ENB causes an immediate reset of state machine circuit 701, while a high signal on input RESET causes a reset of state machine circuit 701 on the next falling edge of clock signal CK0.

Decoder circuit 707 interprets a user code and generates the state machine control signals shown in FIG. 7. The user code can be any code. The output signals are related to the selected divisor as shown in Table 1. Decoder circuits are well known in the art, and virtually any known implementation having the required functionality can be used with the embodiment of FIG. 7.

TABLE 1

| Divisor | Output Signal(s) High |
| --- | --- |
| 1.25 | DV5-DV2.5-DV1.25, DV1.25 |
| 1.5 | DV3-DV1.5, DV1.75-DV1.5, S90GND, S270GND |
| 1.75 | DV7-DV3.5-DV1.75, DV1.75, DV1.75-DV1.5 |
| 2 | DV2, S90GND, S180GND, S270GND |
| 2.25 | DV4.5-DV2.25, DV2.25 |
| 2.5 | DV5-DV2.5-DV1.25, DV2.75-DV2.5, S90GND, S270GND |
| 2.75 | DV5.5-DV2.75, DV2.75, DV2.75-DV2.5 |
| 3 | DV3-DV1.5, S90GND, S180GND, S270GND |
| 3.25 | DV6.75-DV6.5, DV6.5-DV3.25, DV3.25 |
| 3.5 | DV7-DV3.5-DV1.75, DV3.75-DV3.5, S90GND, S270GND |
| 3.75 | DV7.5-DV3.75, DV3.75, DV3.75-DV3.5 |
| 4 | DV4, S90GND, S180GND, S270GND |
| 4.25 | DV4.25 |
| 4.5 | DV5.25-DV4.75-DV4.5, DV4.5-DV2.25, S90GND, S270GND |
| 4.75 | DV4.75, DV5.25-DV4.75-DV4.5 |
| 5 | DV5-DV2.5-DV1.25, S90GND, S180GND, S270GND |
| 5.25 | DV5.25, DV4.75-DV4.5 |
| 5.5 | DV5.75-DV5.5, DV5.5-DV2.75, S90GND, S270GND |
| 5.75 | DV5.75, DV5.75-DV5.5 |
| 6 | DV6, S90GND, S180GND, S270GND |
| 6.25 | DV6.25 |
| 6.5 | DV6.75-DV6.5, DV6.5-DV3.25, S90GND, S270GND |
| 6.75 | DV6.75, DV6.75-DV6.5 |
| 7 | DV7-DV3.5-DV1.75, S90GND, S180GND, S270GND |
| 7.25 | DV7.25 |
| 7.5 | DV7.5-DV3.75, S90GND, S270GND |
| 7.75 | None |
| 8 | DV8, S90GND, S180GND, S270GND |

Figure 7A:
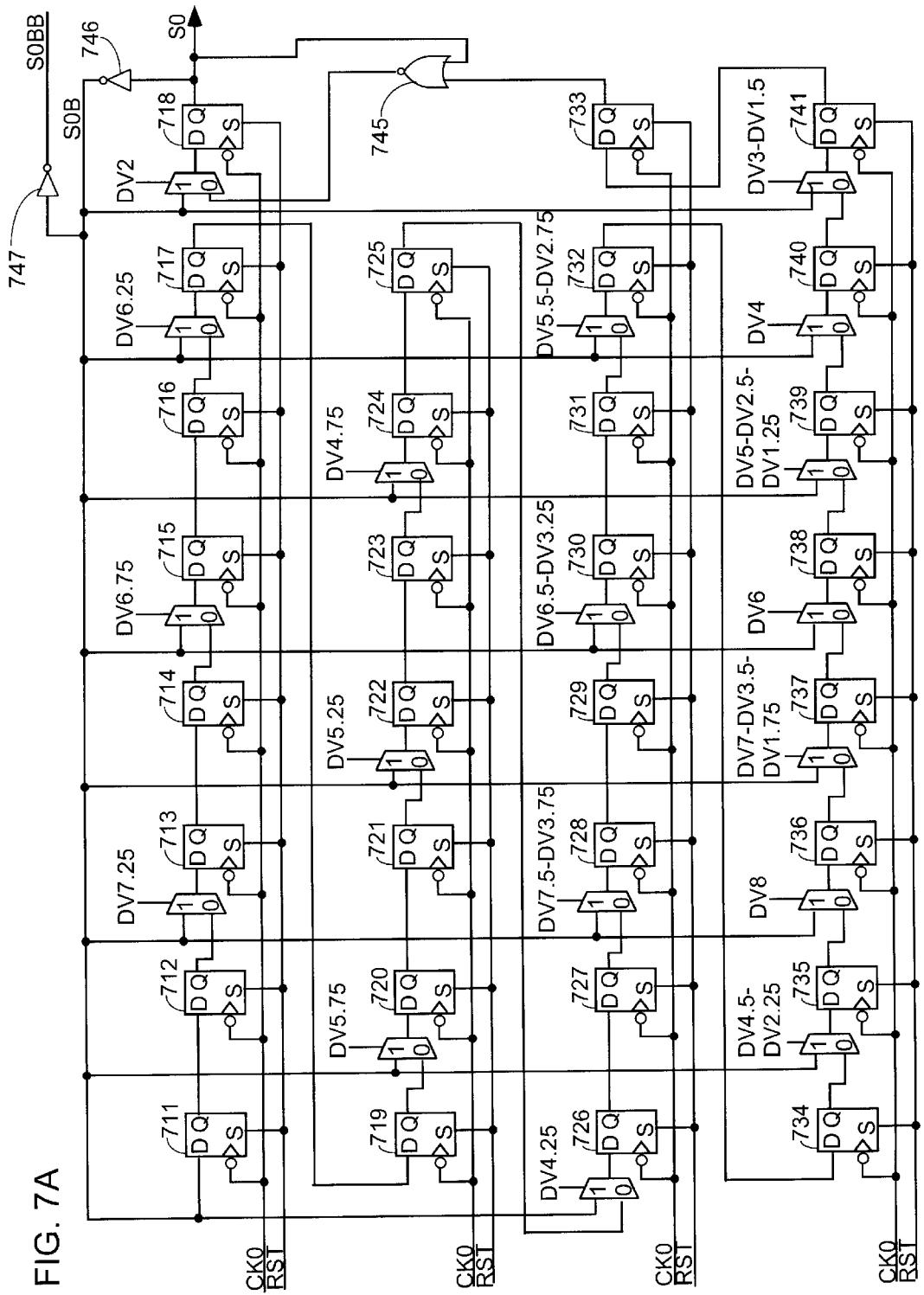
FIGS. 7A and 7B together show a state machine that can be used with the clock generator circuit of FIG. 7.
Figure 7B:
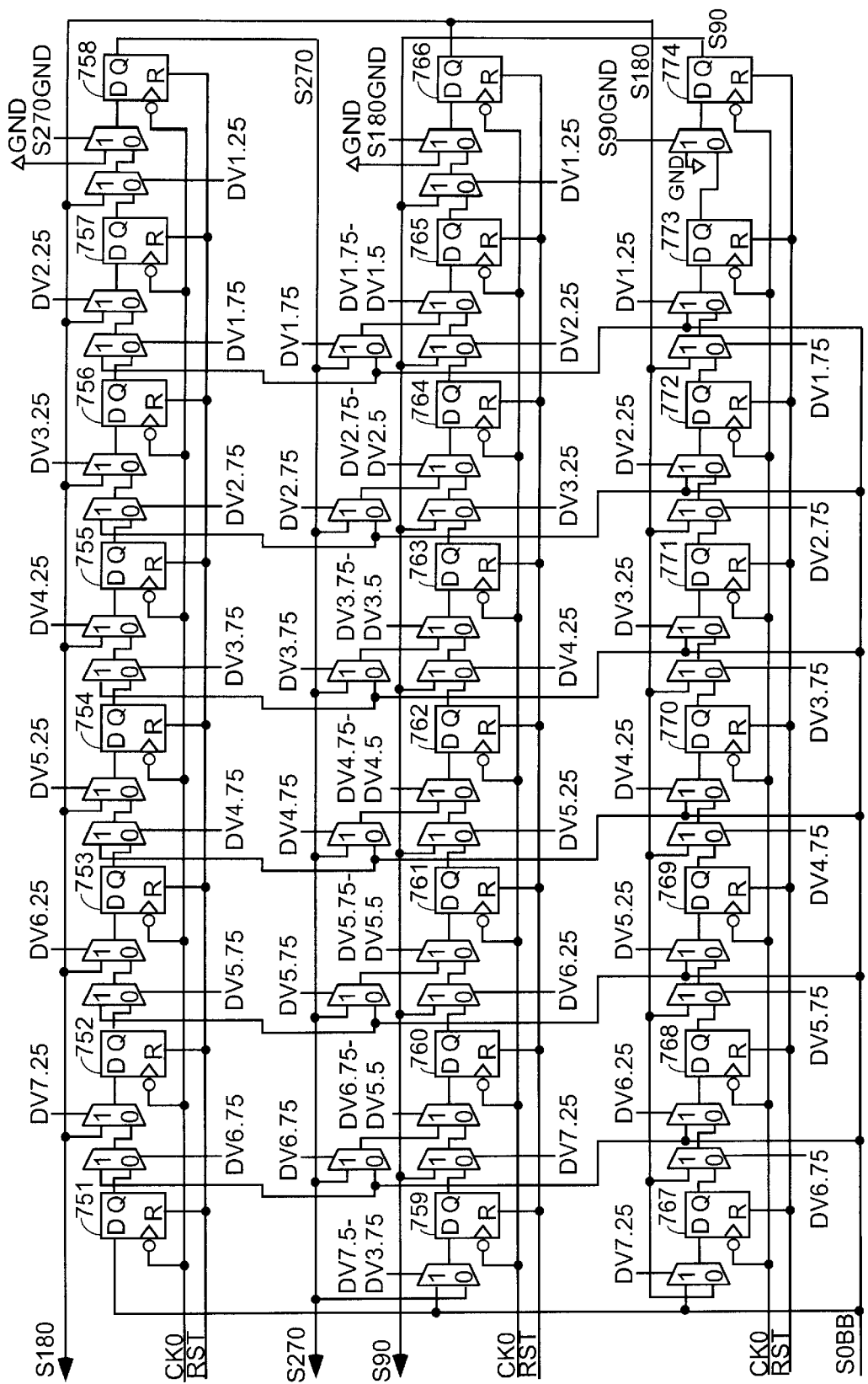

One embodiment of state machine circuit 701 is shown in FIGS. 7A and 7B. Other than the programmable nature of the divisor, state machine circuit 701 functions in a manner similar to that of the state machine of FIG. 3. The signal S0 is created by a feedback loop of set flip-flops, and the signals S90, S180, and S270 are created by delaying signal S0 in a series of reset flip-flops by varying numbers of CK0 clock periods.

FIG. 7A shows the circuit for generating clock select signal S0. The logic follows the same pattern as the S0 generation circuitry shown in FIGS. 3 and 4. A first set flip-flop (in this case flip-flop 718) holds signal S0 high while signal RST is high. When signal RST goes low, signal S0 goes high at the next falling edge of signal CK0, for one CK0 clock period.

The number of clock periods before signal S0 repeats is selectable (programmable) and is determined by the value of the state machine control signals shown in Table 1. The multiplexers shown in FIG. 7A are controlled by these state machine control signals to provide a feedback path of the required length. The longest possible path traverses, in order, flip-flops 711–717, 719–732, 734–741, 733, and 718, or 31 flip-flops. This path provides a repeating pattern of 31 clock periods, and is used for the divisor 7.75. (Note that in Table 1 the divisor 7.75 has no high control signals, because the longest possible path is selected.) The shortest possible path traverses only one flip-flop, flip-flop 718, and is used for a divisor of 2.

The circuit of 7A includes set flip-flops 711–741. The set terminal of each flip-flop is driven by signal RST, and all are clocked by a falling edge on input clock signal CK0.

When all of the state machine control signals are low, flip-flops 711–717, 719–732, and 734–741 are coupled in series. The output Q of flip-flop 741 drives the input D of flip-flop 733, and the output Q of flip-flop 733 drives NOR gate 745 along with signal S0. NOR gate 745 drives the input D of flip-flop 718 when signal DV2 is low. Signal S0B drives the input D of flip-flop 718 when signal DV2 is high. Flip-flop 718 provides clock select output signal S0. Signal S0 also drives inverter 746, which provides internal signal S0B. Signal S0B drives inverter 747, which provides signal S0BB to FIG. 7B.

When one or more of the state machine control signals are high, the multiplexers of FIG. 7A select an appropriate number of delays on the flip-flop loop that generates signal S0.

When signal DV7.25 is high, flip-flop 713 is driven by signal S0B. When signal DV6.75 is high, flip-flop 715 is driven by signal S0B. When signal DV6.25 is high, flip-flop 717 is driven by signal S0B.

When signal DV5.75 is high, flip-flop 720 is driven by signal S0B. When signal DV5.25 is high, flip-flop 722 is driven by signal S0B. When signal DV4.75 is high, flip-flop 724 is driven by signal S0B.

When signal DV4.25 is high, flip-flop 726 is driven by signal S0B. When signal DV7.5-DV3.75 is high, flip-flop 728 is driven by signal S0B. When signal DV6.5-DV3.25 is high, flip-flop 730 is driven by signal S0B. When signal DV5.5-DV2.75 is high, flip-flop 732 is driven by signal S0B.

When signal DV4.5-DV2.25 is high, flip-flop 735 is driven by signal S0B. When signal DV8 is high, flip-flop 736 is driven by signal S0B. When signal DV7-DV3.5-DV1.75 is high, flip-flop 737 is driven by signal S0B. When signal DV6 is high, flip-flop 738 is driven by signal S0B. When signal DV5-DV2.5-DV1.25 is high, flip-flop 739 is driven by signal S0B. When signal DV4 is high, flip-flop 740 is driven by signal S0B. Finally, when signal DV 3-DV1.5 is high, flip-flop 741 is driven by signal S0B.

FIG. 7B shows the circuit for generating clock select signals S90, S180, and S270. The logic follows the same pattern as the S90, S180, and S270 generation circuitry shown in FIGS. 3 and 4. The number of delays between signal S0 and each of signals S90, S180, and S270 is selectable, and is determined by the value of the state machine control signals shown in Table 1. The multiplexers shown in FIG. 7B are controlled by these state machine control signals to provide delays of the appropriate number of CK0 clock periods.

The circuit of FIG. 7B includes reset flip-flops 751–774, with accompanying multiplexers as described below. The reset terminal of each flip-flop is driven by signal RST, and all are clocked by a falling edge on input clock signal CK0.

When all of the state machine control signals are low, flip-flops 751–758 are coupled in series, with the last flip-flop 758 in the series providing clock select signal S270. Flip-flops 759–766 are also coupled in series, with the last flip-flop 766 providing clock select signal S180. Finally, flip-flops 767–774 are also coupled in series, with the last flip-flop 774 providing clock select signal S90. Flip-flop 751 is driven by signal S0BB from FIG. 7A. Because signal DV7.5-DV3.75 is low, flip-flop 759 is driven by signal S270. Because signal DV7.25 is low, flip-flop 767 is driven by signal S180.

When one or more of the state machine control signals are high, the multiplexers of FIG. 7B select appropriate numbers of delays between signal S0BB (which follows signal S0) and clock select output signals S90, S180, and S270.

When signal DV6.75 is high and signal DV7.25 is low, flip-flop 752 is driven by signal S0BB. When signal DV7.25 is high, flip-flop 752 is driven by signal S180. When signal DV5.75 is high and signal DV6.25 is low, flip-flop 753 is driven by signal S0BB. When signal DV6.25 is high, flip-flop 753 is driven by signal S180. When signal DV4.75 is high and signal DV5.25 is low, flip-flop 754 is driven by signal S0BB. When signal DV5.25 is high, flip-flop 754 is driven by signal S180.

When signal DV3.75 is high and signal DV4.25 is low, flip-flop 755 is driven by signal S0BB. When signal DV4.25 is high, flip-flop 755 is driven by signal S180. When signal DV2.75 is high and signal DV3.25 is low, flip-flop 756 is driven by signal S0BB. When signal DV3.25 is high, flip-flop 756 is driven by signal S180. When signal DV1.75 is high and signal DV2.25 is low, flip-flop 757 is driven by signal S0BB. When signal DV2.25 is high, flip-flop 757 is driven by signal S180. When signal DV1.25 is high and signal S270GND is low, flip-flop 758 is driven by signal S180. When signal S270GND is high, flip-flop 758 is driven by signal GND (ground).

When signal DV7.5-DV3.75 is high, flip-flop 759 is driven by signal S0BB.

When signal DV7.25 is high and signal DV6.75-DV5.5 is low, flip-flop 760 is driven by signal S90. When signals DV6.75 and DV6.75-DV5.5 are both high, flip-flop 760 is driven by signal S270. When signal DV6.75 is low and signal DV6.75-DV5.5 is high, flip-flop 760 is driven by signal S0BB.

When signal DV6.25 is high and signal DV5.75-DV5.5 is low, flip-flop 761 is driven by signal S90. When signals DV5.75 and DV5.75-DV5.5 are both high, flip-flop 761 is driven by signal S270. When signal DV5.75 is low and signal DV5.75-DV5.5 is high, flip-flop 761 is driven by signal S0BB.

When signal DV5.25 is high and signal DV4.75-DV4.5 is low, flip-flop 762 is driven by signal S90. When signals DV4.75 and DV4.75-DV4.5 are both high, flip-flop 762 is driven by signal S270. When signal DV4.75 is low and signal DV4.75-DV4.5 is high, flip-flop 762 is driven by signal S0BB.

When signal DV4.25 is high and signal DV3.75-DV3.5 is low, flip-flop 763 is driven by signal S90. When signals DV3.75 and DV3.75-DV3.5 are both high, flip-flop 763 is driven by signal S270. When signal DV3.75 is low and signal DV3.75-DV3.5 is high, flip-flop 763 is driven by signal S0BB.

When signal DV3.25 is high and signal DV2.75-DV2.5 is low, flip-flop 764 is driven by signal S90. When signals DV2.75 and DV2.75-DV2.5 are both high, flip-flop 764 is driven by signal S270. When signal DV2.75 is low and signal DV2.75-DV2.5 is high, flip-flop 764 is driven by signal S0BB.

When signal DV2.25 is high and signal DV1.75-DV1.5 is low, flip-flop 765 is driven by signal S90. When signals DV1.75 and DV1.75-DV1.5 are both high, flip-flop 765 is driven by signal S270. When signal DV1.75 is low and signal DV1.75-DV1.5 is high, flip-flop 765 is driven by signal S0BB.

When signal DV1.25 is high and signal S180GND is low, flip-flop 766 is driven by signal S90. When signal S180GND is high, flip-flop 766 is driven by signal GND (ground).

When signal DV7.25 is high, flip-flop 767 is driven by signal S0BB. When signal DV6.75 is high and signal DV6.25 is low, flip-flop 768 is driven by signal S180. When signal DV6.25 is high, flip-flop 768 is driven by signal S0BB. When signal DV5.75 is high and signal DV5.25 is low, flip-flop 769 is driven by signal S180. When signal DV5.25 is high, flip-flop 769 is driven by signal S0BB. When signal DV4.75 is high and signal DV4.25 is low, flip-flop 770 is driven by signal S180. When signal DV4.25 is high, flip-flop 770 is driven by signal S0BB.

When signal DV3.75 is high and signal DV3.25 is low, flip-flop 771 is driven by signal S180. When signal DV3.25 is high, flip-flop 771 is driven by signal S0BB. When signal DV2.75 is high and signal DV2.25 is low, flip-flop 772 is driven by signal S180. When signal DV2.25 is high, flip-flop 772 is driven by signal S0BB. When signal DV1.75 is high and signal DV1.25 is low, flip-flop 773 is driven by signal S180. When signal DV1.25 is high, flip-flop 773 is driven by signal S0BB. When signal S90GND is high, flip-flop 774 is driven by signal GND (ground).

Figure 8:
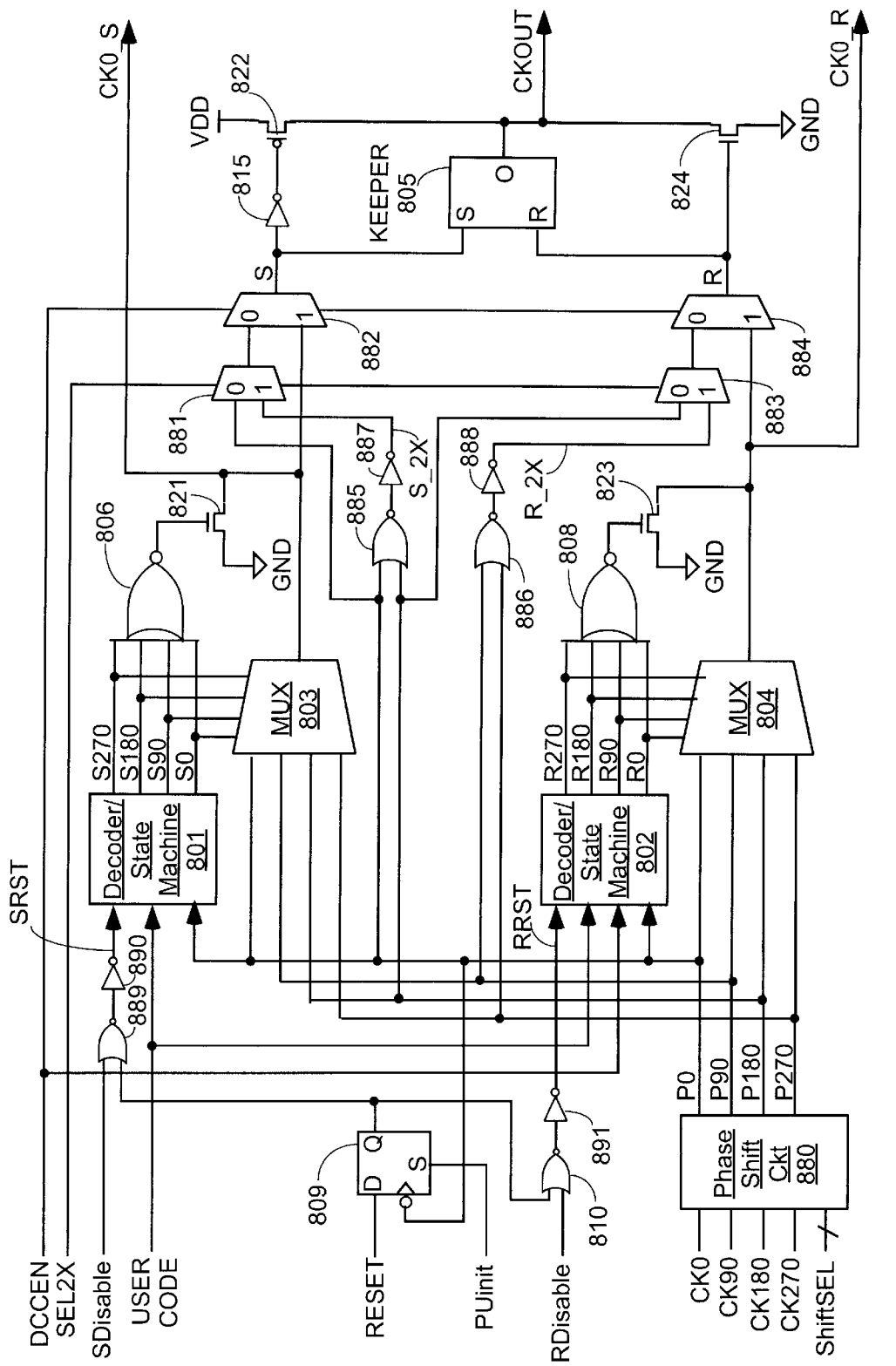
FIG. 8 shows a clock generator circuit having a programmable divisor, optional duty cycle correction, phase shift capability, and an optional 2× output clock according to another embodiment of the invention.

FIG. 8 provides another exemplary clock generator circuit that includes all of the capabilities described above, with some additional capabilities. The embodiment of FIG. 8 is programmable, having a user code that selects the divisor. As in the embodiment of FIG. 7, the divisor can be any of the following values: 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, and 8. However, when the optional duty cycle correction is enabled, the divisor is limited to any of the following values: 1.5, 2, 2.5, 3, 3.5, 4, 4.5, 5, 5.5, 6, 6.5, 7, 7.5, and 8. Other embodiments of the invention having a programmable divisor provide other choices and/or numbers of divisors.

The embodiment of FIG. 8 also offers optional phase shifting as in the embodiment of FIG. 6, synchronous reset as in the embodiment of FIG. 7, the ability to independently disable the S and R state machine circuits, and an optional 2× output clock having twice the frequency of the input clock signal.

The clock generator circuit of FIG. 8 includes decoder/state machine circuits 801 and 802, 4-to-1 multiplexer circuits 803 and 804, logical NOR circuits 806 and 808, pulldown circuits 821, 823, and 824, keeper circuit 805, inverter 815, and pullup circuit 822. These elements form a circuit similar to that of FIG. 5, and function in a similar fashion to provide optional duty cycle correction (DCC) to the output signal. The circuit of FIG. 8 also includes set flip-flop 809, NOR gates 889 and 810, and inverters 890 and 891, which provide a synchronous and asynchronous reset capability as in the embodiment of FIG. 7. Phase shift circuit 880 provides an optional phase shift capability. Phase shift circuit 880 can be similar, for example, to phase shift circuit 605 in FIG. 6. Also included are multiplexers 881–884, NOR gates 885–886, and inverters 887–888.

Note that in the embodiment of FIG. 8, the output signals from multiplexer circuits 803 and 804 (which correspond to signals S and R, respectively, in FIG. 5) are provided as output signals from the clock generator circuit. Therefore, the clock generator circuit can provide three output signals at any given time.

When DCC enable signal DCCEN is high (i.e., the DCC capability is enabled for the divided clock), the divided output signal appears on clock terminal CKOUT, which has duty cycle correction. In this mode, the three output signals include a duty cycle corrected divided clock signal CKOUT and two non-duty cycle corrected divided clock signals CK0_S and CK0_R. All three output signals have the same divisor. In this mode, supported divisors include 1 (when RESET is high), 1.5, 2, . . . , 7.5, and 8. Signal CK0_S has the same phase as output signal CKOUT. Signal C0_R is 180 degrees out of phase with output signal CKOUT.

When DCC enable signal DCCEN is low (i.e., the DCC capability is disabled for the divided clock), output nodes CK0_S and CK0_R each provide a divided clock with any supported divisor and no duty cycle correction. Supported divisors include 1 (when the circuit is reset), 1.25, 1.5, . . . , 7.75, and 8.

When DCC enable signal DCCEN is low, the divided output signal is not available at the CKOUT output terminal. In this mode, multiplexers 882 and 884 select the signals from multiplexers 881 and 883, respectively, to drive pullup and pulldown circuits 822 and 824, respectively. When control signal SEL2x is low, multiplexers 881 and 883 provide signals P0 and P180, respectively. When control signal SEL2x is high, multiplexers 881 and 882 provide signals S_2x and R_2x, respectively.

Signal S_2x is provided by ORing together signals P0 and P180 in NOR gate 885 followed by inverter 887. Therefore, signal S_2x is a signal having the same phase as signal P0 but twice the frequency. Signal R_2x is provided by ORing together signals P90 and P270 in NOR gate 886 followed by inverter 888. Therefore, signal R_2x is a signal having the same phase as signal P90 but twice the frequency.

Thus, when DCC enable signal DCCEN is low, output signal CKOUT has the same phase as signal P0 and is duty cycle corrected, but is not divided. The frequency of signal CKOUT is either the same as signal P0 (1x, when signal SEL2x is low) or twice the frequency of signal P0 (2x, when signal SEL2x is high).

In one embodiment (not shown), set and reset state machine circuits have separate user codes. In this embodiment, the two state machine circuits can implement different divisors. Thus, when signal DCCEN is low, output nodes CK0_S and CK0_R can provide divided clocks with different divisors, while the CKOUT terminal provides either the 1x or the 2x clock. When DCCEN is high in this embodiment, the two user codes must be set to the same value.

In some embodiments where the same user code is used for both set and reset portions of the circuit, the set and reset decodes are implemented in a signal decoder circuit. In some such circuits, some of the state machine control signals are shared between the set and reset state machine circuits. In other embodiments where the same user code is used for both set and reset portions of the circuit, a single state machine circuit is used to generate both the set and reset clock select signals.

Other clock output signals can be provided by making minor modifications to the circuit of FIG. 8. In one embodiment (not shown), a 4x clock is provided by ORing together the four phased input clock signals and providing the resulting signal to one of the output nodes, in a fashion similar to that used to provide a 2x clock.

Figure 9:
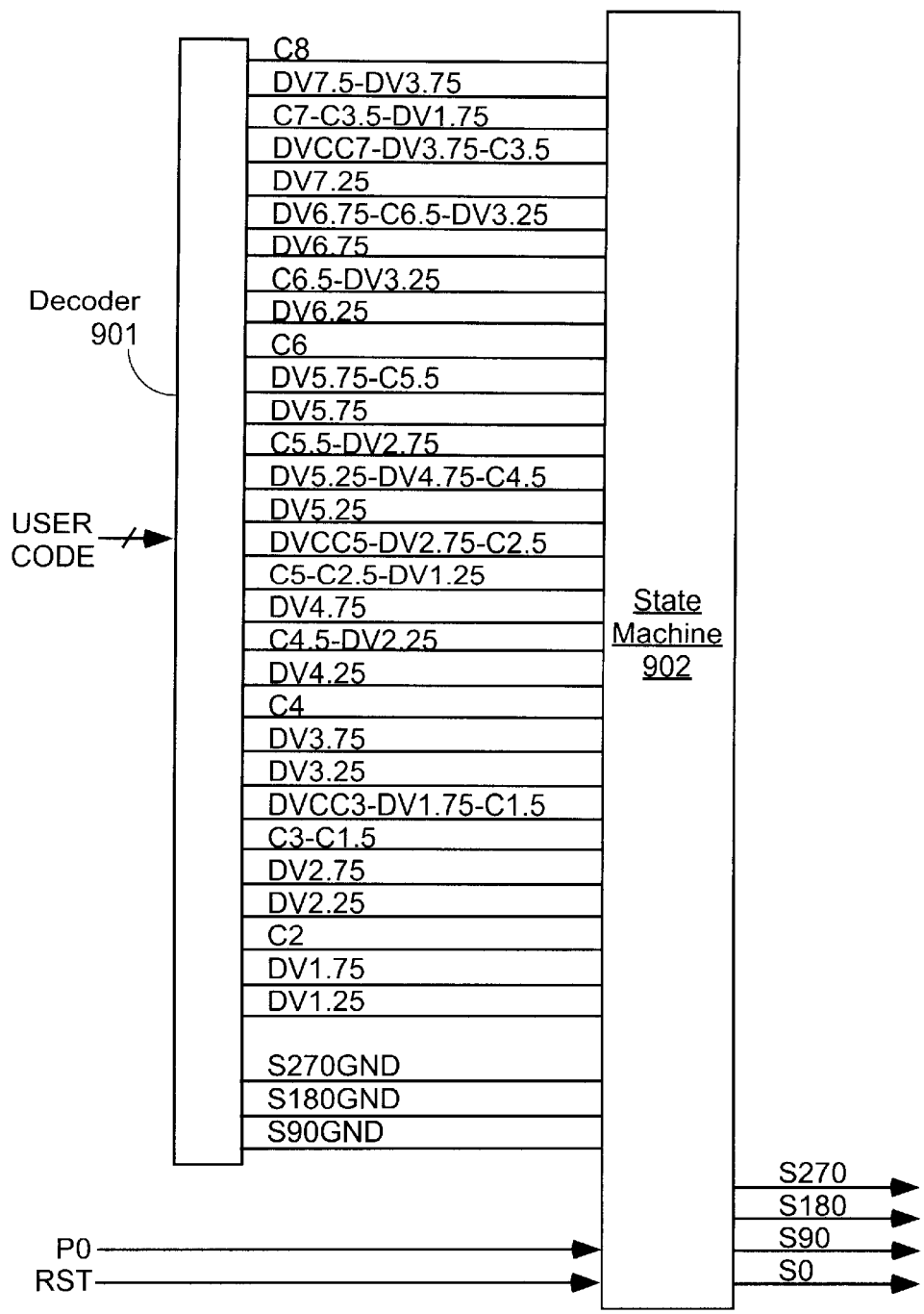
FIG. 9 shows a "set" decoder and state machine that can be used with the embodiment of FIG. 8.
Figure 10:
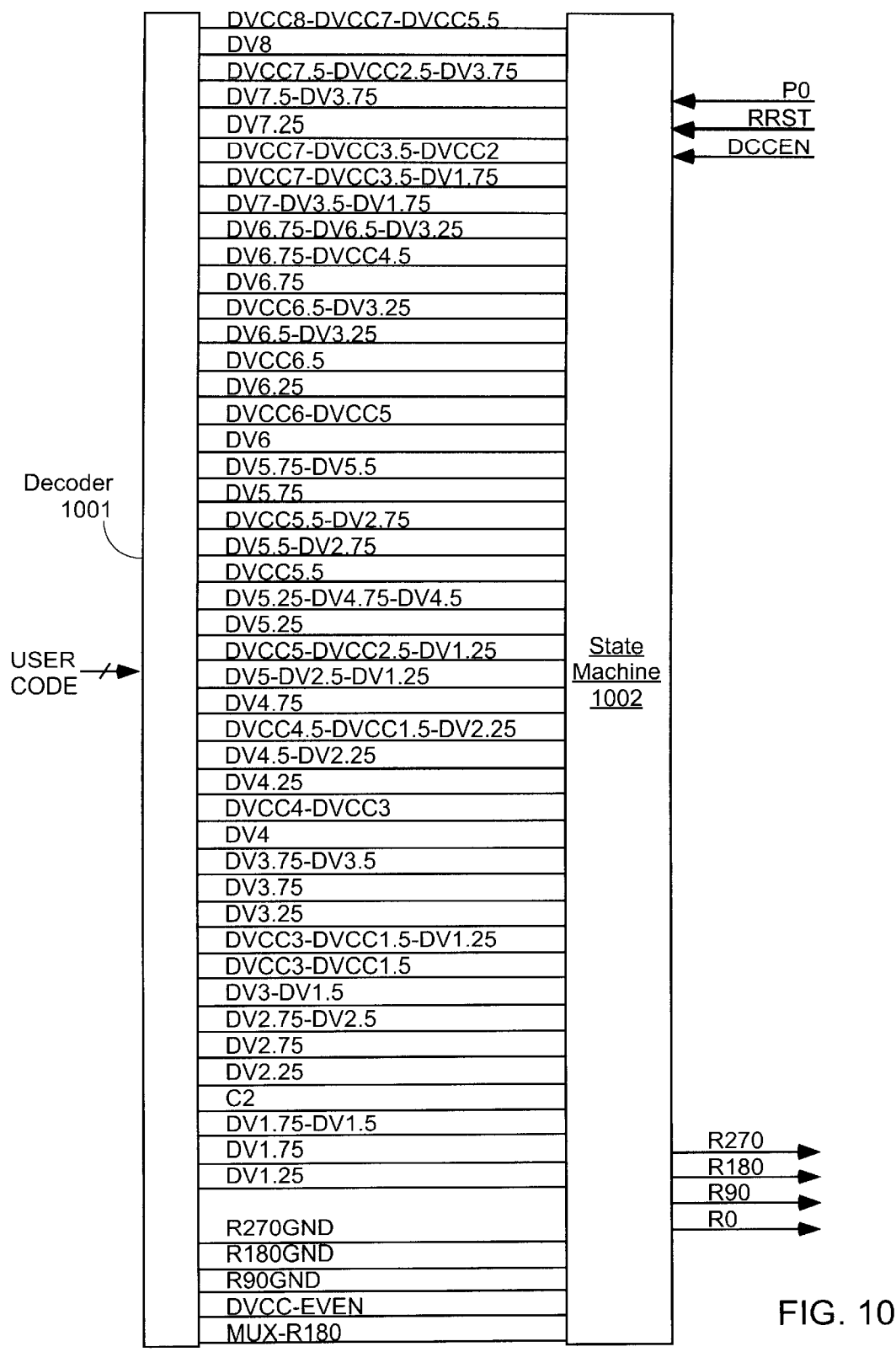
FIG. 10 shows a "reset" decoder and state machine that can be used with the embodiment of FIG. 8.

FIGS. 9 and 10 show embodiments of decoder/state machine circuits 801 and 802, respectively, that can be used with the embodiment of FIG. 8.

FIG. 9 shows one embodiment of set decoder and state machine circuit 801. The decoder/state machine circuit of FIG. 9 includes a decoder circuit 901 and a set state machine 902. Decoder circuit 901 interprets a user code and generates the set state machine control signals shown in FIG. 9. The user code can be any code. Decoder circuits are well known in the art, and virtually any known implementation having the required functionality can be used with the embodiment of FIG. 9.

The values of the state machine control signals are shown in Tables 2 and 3 for each supported divisor. As described above, certain divisors (1.25, 1.75, . . . , 7.25, 7.75) are not supported when duty cycle correction is enabled. Therefore, the values of the state machine control signals are different when DCC is enabled and when DCC is disabled. The values of the set state machine control signals when DCC is enabled (DCCEN is high) are shown in. Table 2. The values when DCC is disabled (DCCEN is low) are shown in Table 3.

TABLE 2

SET DECODER, DCC ENABLED*

| Divisor | Output Signal(s) High |
|---|---|
| 1.25 | Not Supported |
| 1.5 | C3-C1.5, DVCC3-DV1.75-C1.5, S90GND, S270GND |
| 1.75 | Not Supported |
| 2 | C2, S90GND, S180GND, S270GND |
| 2.25 | Not Supported |
| 2.5 | DVCC5-DV2.75-C2.5, C5-C2.5-DV1.25, S90GND, S270GND |
| 2.75 | Not Supported |
| 3 | C3-C1.5, S90GND, S180GND, S270GND |
| 3.25 | Not Supported |
| 3.5 | C7-C3.5-DV1.75, DVCC7-DV3.75-C3.5, S90GND, S270GND |
| 3.75 | Not Supported |
| 4 | C4, S90GND, S180GND, S270GND |
| 4.25 | Not Supported |
| 4.5 | DV5.25-DV4.75-C4.5, C4.5-DV2.25, S90GND, S270GND |
| 4.75 | Not Supported |
| 5 | C5-C2.5-DV1.25, S90GND, S180GND, S270GND |
| 5.25 | Not Supported |
| 5.5 | DV5.75-C5.5, C5.5-DV2.75, S90GND, S270GND |
| 5.75 | Not Supported |
| 6 | C6, S90GND, S180GND, S270GND |
| 6.25 | Not Supported |
| 6.5 | DV6.75-C6.5-DV3.25, C6.5-DV3.25, S90GND, S270GND |
| 6.75 | Not Supported |
| 7 | C7-C3.5-DV1.75, S90GND, S180GND, S270GND |
| 7.25 | Not Supported |
| 7.5 | DV7.5-DV3.75, S90GND, S270GND |
| 7.75 | Not Supported |
| 8 | C8, S90GND, S180GND, S270GND |

*Some divisors are not supported when the DCC feature is enabled.

TABLE 3

SET DECODER, DCC DISABLED

| Divisor | Output Signal(s) High |
|---|---|
| 1.25 | C5-C2.5-DV1.25, DV1.25 |
| 1.5 | C3-C1.5, DVCC3-DV1.75-C1.5, S90GND, S270GND |
| 1.75 | C7-C3.5-DV1.75, DVCC3-DV1.75-C1.5, DV1.75 |
| 2 | C2, S90GND, S180GND, S270GND |
| 2.25 | C4.5-DV2.25, DV2.25 |
| 2.5 | DVCC5-DV2.75-C2.5, C5-C2.5-DV1.25, S90GND, S270GND |
| 2.75 | DVCC5-DV2.75-C2.5, C5.5-DV2.75, DV2.75 |
| 3 | C3-C1.5, S90GND, S180GND, S270GND |
| 3.25 | C6.5-DV3.25, DV3.25 |
| 3.5 | C7-C3.5-DV1.75, DVCC7-DV3.75-C3.5, S90GND, S270GND |
| 3.75 | DV7.5-DV3.75, DV3.75 |
| 4 | C4. S90GND, S180GND, S270GND |
| 4.25 | DV4.25 |
| 4.5 | DV5.25-DV4.75-C4.5, C4.5-DV2.25, S90GND, S270GND |
| 4.75 | DV5.25-DV4.75-C4.5, DV4.75 |
| 5 | C5-C2.5-DV1.25, S90GND, S180GND, S270GND |
| 5.25 | DV5.25 |
| 5.5 | DV5.75-C5.5, C5.5-DV2.75, S90GND, S270GND |
| 5.75 | DV5.75, DV5.75-C5.5 |
| 6 | C6, S90GND, S180GND, S270GND |
| 6.25 | DV6.25 |
| 6.5 | DV6.75-C6.5-DV3.25, C6.5-DV3.25, S90GND, S270GND |
| 6.75 | DV6.75-C6.5-DV3.25, DV6.75 |
| 7 | C7-C3.5-DV1.75, S90GND, S180GND, S270GND |
| 7.25 | DV7.25 |

TABLE 3-continued

SET DECODER, DCC DISABLED

| Divisor | Output Signal(s) High |
|---|---|
| 7.5 | DV7.5-DV3.75, S90GND, S270GND |
| 7.75 | None |
| 8 | C8, S90GND, S180GND, S270GND |

Figure 9A:
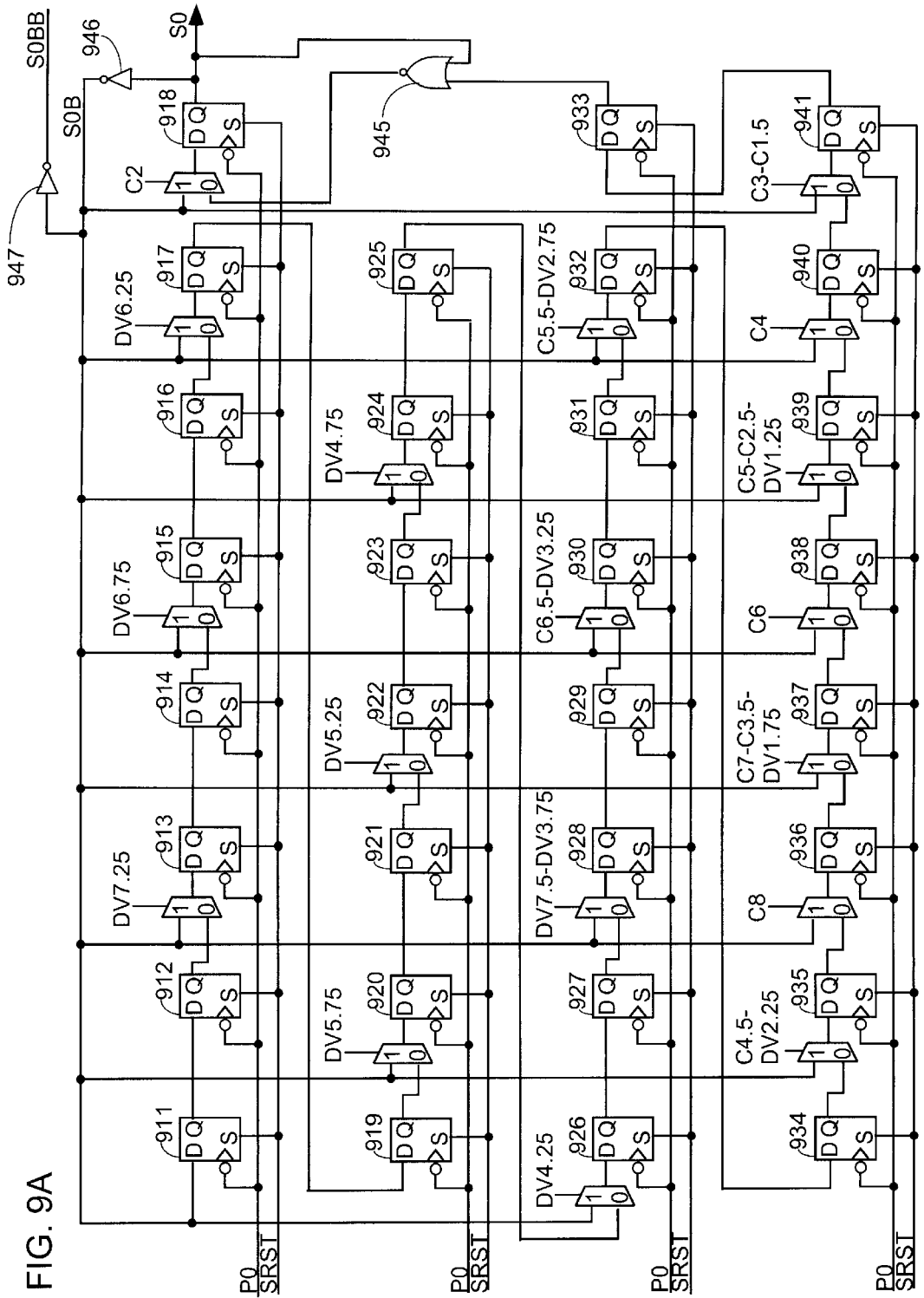
FIGS. 9A and 9B together show one embodiment of the "set" state machine of FIG. 9.
Figure 9B:
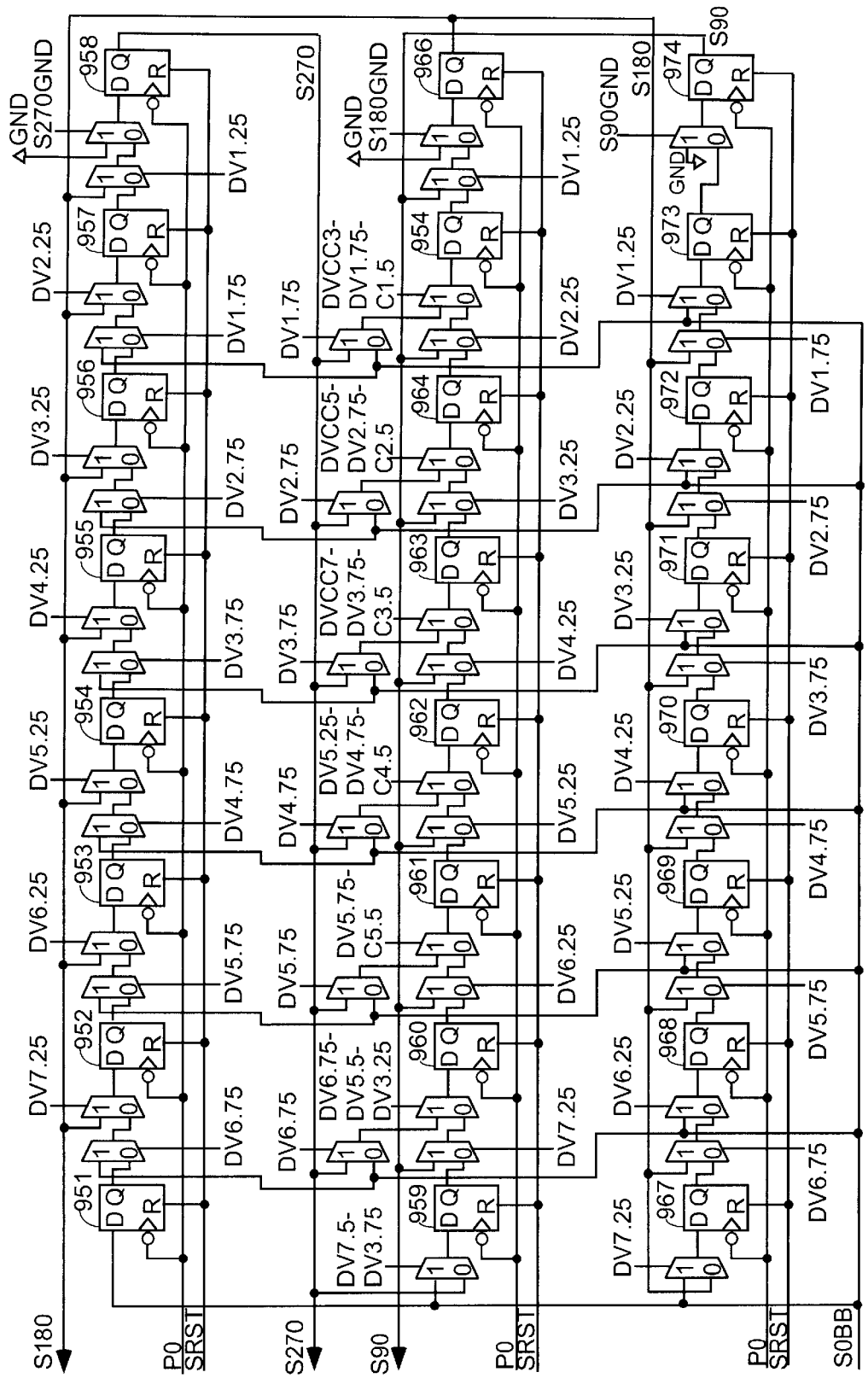

One embodiment of state machine circuit 902 is shown in FIGS. 9A and 9B. State machine circuit 902 functions in a manner similar to state machine circuit 701 of FIG. 7. Signal S0 is created by a feedback loop of set flip-flops, and signals S90, S180, and S270 are created by delaying signal S0 in a series of reset flip-flops by varying numbers of CK0 clock periods.

FIG. 9A shows the circuit for generating clock select signal S0. Note that the circuit of FIG. 9A is the same as the circuit of FIG. 7A, other than changes to the names of the state machine control signals. Thus, the circuit is not further described here.

FIG. 9B shows the circuit for generating clock select signals S90, S180, and S270. Note that the circuit of FIG. 9B is the same as the circuit of FIG. 7B, other than changes to the names of the state machine control signals. Thus, the circuit is not further described here.

FIG. 10 shows one embodiment of reset decoder and state machine circuit 802 of FIG. 8. The decoder/state machine circuit of FIG. 10 includes a decoder circuit 1001 and a reset state machine 1002. Decoder circuit 1001 interprets a user code and generates the reset state machine control signals shown in FIG. 10. The user code can be any code. Decoder circuits are well known in the art, and virtually any known implementation having the required functionality can be used with the embodiment of FIG. 10.

The values of the state machine control signals are related to the selected divisor as shown in Tables 4 and 5. The values of the reset state machine control signals when DCC is enabled (DCCEN is high) are shown in Table 4. The values when DCC is disabled (DCCEN is low) are shown in Table 5.

For simplicity, some of the same signal names are used for the reset state machine control signals as for the set state machine control signals. Regardless of the similarity of some signal names, the control signals are not necessarily the same for the two state machines.

TABLE 4

RESET DECODER, DCC ENABLED*

| Divisor | Output Signal(s) High |
|---|---|
| 1.25 | Not Supported |
| 1.5 | DVCC4.5-DVCC1.5-DV2.25, DV3-DV1.5, DVCC3-DVCC1.5, R270GND, MUX-R180 |
| 1.75 | Not Supported |
| 2 | C2, DVCC7-DVCC3.5-DVCC2, R90GND, R270GND, DVCC-EVEN, MUX-R180 |
| 2.25 | Not Supported |
| 2.5 | DVCC7.5-DVCC2.5-DV3.75, DV5-DV2.5-DV1.25, DVCC5-DVCC2.5-DV1.25, MUX-R180 |
| 2.75 | Not Supported |
| 3 | DVCC4-DVCC3, DV3-DV1.5, R90GND, R270GND |
| 3.25 | Not Supported |
| 3.5 | DV7-DV3.5-DV1.75, DVCC7-DVCC3.5-DV1.75, DV5.25, MUX-R180 |
| 3.75 | Not Supported |

TABLE 4-continued

RESET DECODER, DCC ENABLED*

| Divisor | Output Signal(s) High |
|---|---|
| 4 | DVCC4-DVCC3, DV4, R90GND, R270GND, DVCC-EVEN, MUX-R180 |
| 4.25 | Not Supported |
| 4.5 | DV6.75-DVCC4.5, DVCC4.5-DVCC1.5-DV2.25, DV4.5-DV2.25, MUX-R180 |
| 4.75 | Not Supported |
| 5 | DVCC6-DVCC5, DV5-DV2.5-DV1.25, R90GND, R270GND |
| 5.25 | Not Supported |
| 5.5 | DVCC5.5-DV2.75, DV5.5-DV2.75, DVCC5.5, R180GND, MUX-R180 |
| 5.75 | Not Supported |
| 6 | DVCC6-DVCC5, DV6, R90GND, R270GND, DVCC-EVEN, MUX-R180 |
| 6.25 | Not Supported |
| 6.5 | DVCC6.5-DV3.25, DVCC6.5, DV6.5-DV3.25, MUX-R180 |
| 6.75 | Not Supported |
| 7 | DVCC8-DVCC7-DVCC5.5, DV7-DV3.5-DV1.75, R90GND, R270GND |
| 7.25 | Not Supported |
| 7.5 | DVCC7.5-DVCC2.5-DV3.75, DV7.5-DV3.75, DV3.75-DV3.5, MUX-R180 |
| 7.75 | Not Supported |
| 8 | DVCC8-DVCC7-DVCC5.5, DV8, R90GND, R270GND, DVCC-EVEN, MUX-R180 |

*Some divisors are not supported when the DCC feature is enabled.

TABLE 5

RESET DECODER, DCC DISABLED

| Divisor | Output Signal(s) High |
|---|---|
| 1.25 | DV5-DV2.5-DV1.25, DVCC5-DVCC2.5-DV1.25, DVCC3-DVCC1.5-DV1.25, DV1.25 |
| 1.5 | DV3-DV1.5, DV1.75-DV1.5, R90GND, R270GND |
| 1.75 | DV7-DV3.5-DV1.75, DVCC7-DVCC3.5-DV1.75, DV1.75, DV1.75-DV1.5 |
| 2 | C2, R90GND, R180GND, R270GND |
| 2.25 | DVCC4.5-DVCC1.5-DV2.25, DV4.5-DV2.25, DV2.25 |
| 2.5 | DV5-DV2.5-DV1.25, DV2.75-DV2.5, R90GND, R270GND |
| 2.75 | DVCC5.5-DV2.75, DV5.5-DV2.75, DV2.75, DV2.75-DV2.5 |
| 3 | DV3-DV1.5, R90GND, R180GND, R270GND |
| 3.25 | DV6.75-DV6.5-DV3.25, DV6.5-DV3.25, DVCC6.5-DV3.25, DVCC6.5, DV3.25 |
| 3.5 | DV7-DV3.5-DV1.75, DV3.75-DV3.5, R90GND, R270GND |
| 3.75 | DVCC7.5-DVCC2.5-DV3.75, DV7.5-DV3.75, DV3.75, DV3.75-DV3.5 |
| 4 | DV4, R90GND, R180GND, R270GND |
| 4.25 | DV4.25 |
| 4.5 | DV5.25-DV4.75-DV4.5, DV4.5-DV2.25, R90GND, R270GND |
| 4.75 | DV5.25-D4.75-DV4.5, DV4.75 |
| 5 | DV5-DV2.5-DV1.25, R90GND, R180GND, R270GND |
| 5.25 | DV5.25 |
| 5.5 | DV5.75-DV5.5, DV5.5-DV2.75, R90GND, R270GND |
| 5.75 | DV5.75, DV5.75-DV5.5 |
| 6 | DV6, R90GND, R180GND, R270GND |
| 6.25 | DV6.25 |
| 6.5 | DV6.75-DV6.5-DV3.25, DV6.5-DV3.25, R90GND, R270GND |
| 6.75 | DV6.75, DV6.75-DV6.5-DV3.25, DV6.75-DVCC4.5 |
| 7 | DV7-DV3.75-DV1.75, R90GND, R180GND, R270GND |
| 7.25 | DV7.25 |
| 7.5 | DV7.5-DV3.75, R90GND, R270GND |
| 7.75 | None |
| 8 | DV8, R90GND, R180GND, R270GND |

Figure 10A:
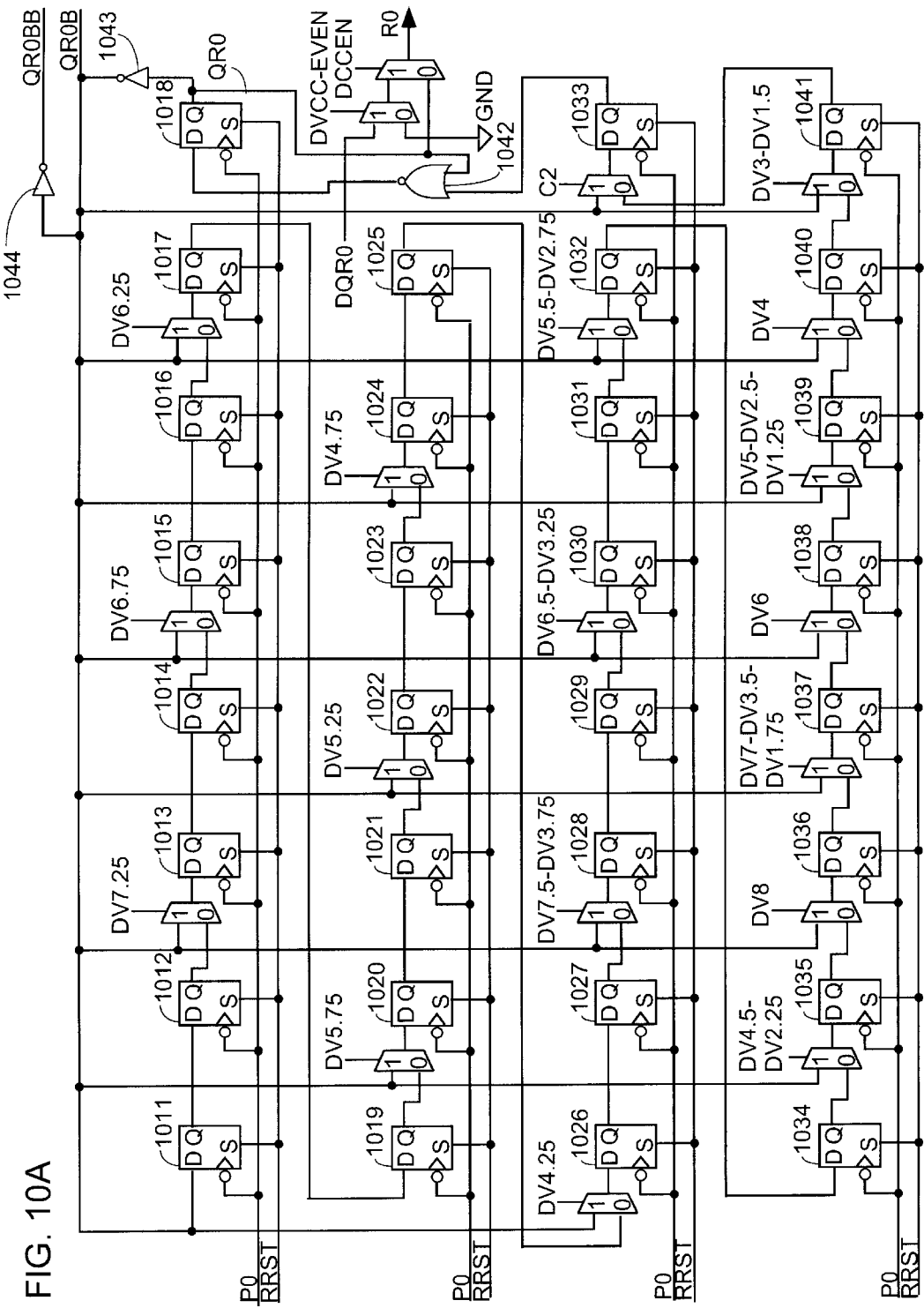
FIGS. 10A, 10B, and 10C together show one embodiment of the "reset" state machine of FIG. 10.
Figure 10B:
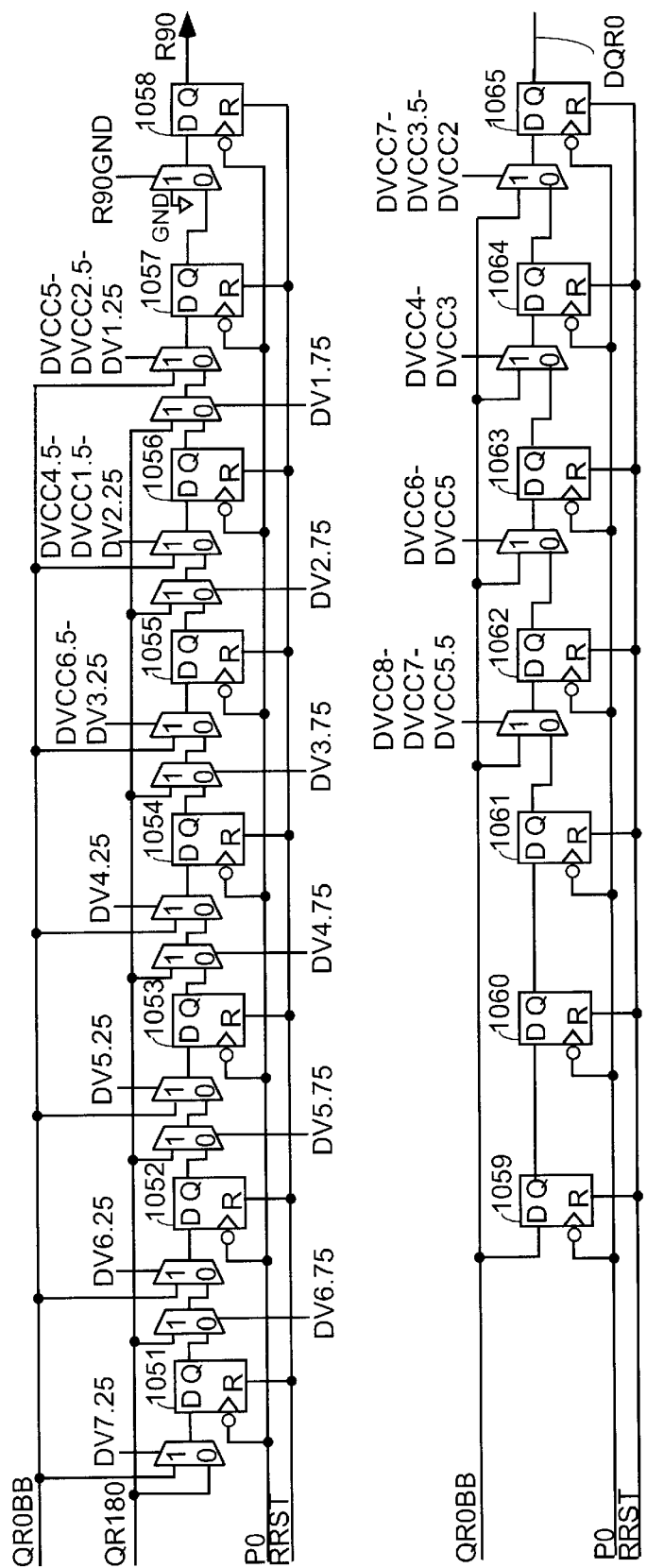
Figure 10C:
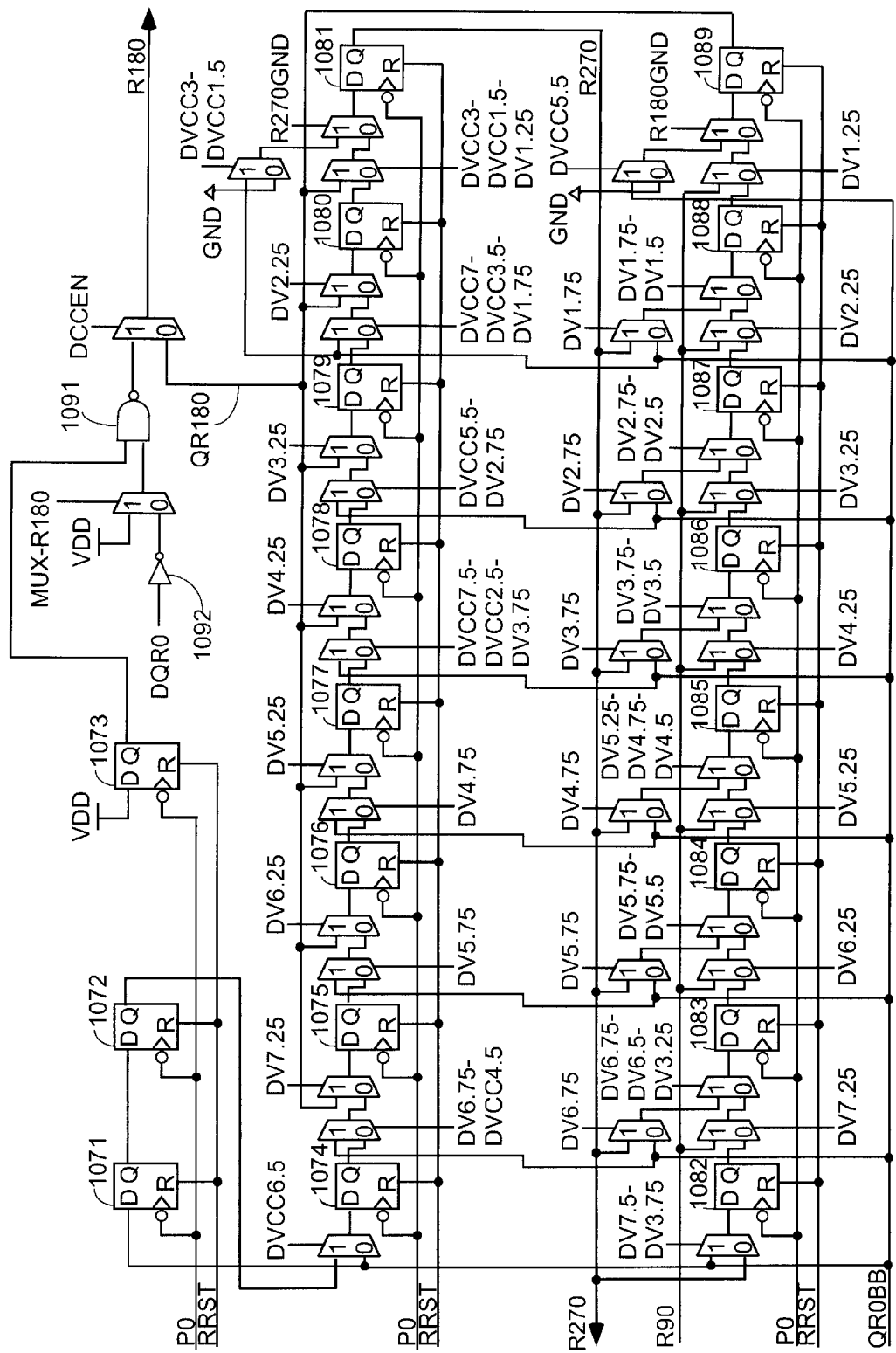

One embodiment of state machine circuit 1002 is shown in FIGS. 10A, 10B, and 10C. Reset state machine circuit 1002 functions in a manner similar to the reset state machine of FIG. 5A. An internal signal QR0 is similar in function to signal RINT of FIG. 5A. This signal and its buffered counterpart, QR0BB, go low on the first falling P0 clock edge after the reset signal RRST goes low. Internal signals QR0 is cyclical, generated by a feedback loop that includes a programmable number of set flip-flops. Clock select signal R0 follows signal QR0. Clock select signals R90, R180, and R270 all follow signal QR0 by various numbers of clock periods, delayed by programmable numbers of reset flip-flops. The number of flip-flops in each signal path is controlled by the state machine control signals generated by decoder circuit 1001 of FIG. 10.

FIG. 10A shows the circuit for generating clock select signal R0 and internal signals QR0 and QR0BB (the buffered version of signal QR0 used in FIGS. 10B and 10C). Note that the circuit of FIG. 10A is the same as the circuit of FIG. 9A, other than the changes to the names of the state machine control signals and the circuitry that directly generates clock select signal R0 from internal signal QR0. The circuit of FIG. 10A includes two multiplexers controlled by reset state machine control signal DVCC-EVEN and DCC enable signal DCCEN.

When signal DCCEN is low, clock select signal R0 follows internal signal QR0. When signals DCCEN and DCC-EVEN are both high, signal R0 follows signal DQR0 from FIG. 10B. When signal DCCEN is high and signal DCC-EVEN is low, signal R0 is tied to ground (GND).

FIG. 10B shows the circuit for generating clock select signal R90 and internal signal DQR0 (which is used in FIG. 10A). The circuit of FIG. 10B includes reset flip-flops 1051–1065, with accompanying multiplexers as described below. The reset terminal of each flip-flop is driven by signal RRST, and all are clocked by a falling edge on clock signal P0.

When all of the reset state machine control signals are low, flip-flops 1051–1058 are coupled in series, with the last flip-flop 1058 in the series providing clock select signal R90. Flip-flops 1059–1065 are also coupled in series, with the last flip-flop 1065 providing internal signal DQR0 (which is used in FIGS. 10A and 10C). Flip-flop 1051 is driven by signal QR180 from FIG. 10C, and flip-flop 1059 is driven by signal QR0BB from FIG. 10A.

When one or more of the reset state machine control signals are high, the multiplexers of FIG. 10B select appropriate numbers of delays between signal QR0BB (which follows signal R0) and clock select output signals R90 and DQR0.

When signal DV7.25 is high, flip-flop 1051 is driven by signal QR0BB. When signal DV6.75 is high and signal DV6.25 is low, flip-flop 1052 is driven by signal QR180. When signal DV6.25 is high, flip-flop 1052 is driven by signal QR0BB. When signal DV5.75 is high and signal DV5.25 is low, flip-flop 1053 is driven by signal QR180. When signal DV5.25 is high, flip-flop 1053 is driven by signal QR0BB.

When signal DV4.75 is high and signal DV4.25 is low, flip-flop 1054 is driven by signal QR180. When signal DV4.25 is high, flip-flop 1054 is driven by signal QR0BB. When signal DV3.75 is high and signal DVCC6.5-DV3.25 is low, flip-flop 1055 is driven by signal QR180. When signal DVCC6.5-DV3.25 is high, flip-flop 1055 is driven by signal QR0BB.

When signal DV2.75 is high and signal DVCC4.5-DVCC1.5-DV2.25 is low, flip-flop 1056 is driven by signal QR180. When signal DVCC4.5-DVCC1.5-DV2.25 is high, flip-flop 1056 is driven by signal QR0BB. When signal DV1.75 is high and signal DVCC5-DVCC2.5-DV1.25 is low, flip-flop 1057 is driven by signal QR180. When signal DVCC5-DVCC2.5-DV1.25 is high, flip-flop 1057 is driven by signal QR0BB.

When signal R90GND is high, the input D of flip-flop 1058 is tied to ground (GND).

When signal DVCC8-DVCC7-DVCC5.5 is high, flip-flop 1062 is driven by signal QR0BB. When signal DVCC6-DVCC5 is high, flip-flop 1063 is driven by signal QR0BB. When signal DVCC4-DVCC 3 is high, flip-flop 1064 is driven by signal QR0BB. Finally, when signal DVCC7-DVCC 3.5-DVCC2 is high, flip-flop 1066 is driven by signal QR0BB.

FIG. 10C shows the circuit for generating clock select signals R180 and R270. The circuit of FIG. 10C includes reset flip-flops 1071–1089, inverter 1092, and NAND gate 1091, with accompanying multiplexers as described below. The reset terminal of each flip-flop is driven by signal RRST, and all are clocked by a falling edge on signal P0.

The input D of flip-flop 1073 is coupled to VDD (power high), and the output Q drives NAND gate 1091. The other input to NAND gate 1091 is VDD when signal MUX-R180 is high, and the inverse of signal DQR0 (inverted by inverter 1092) when signal MUX-R180 is low. Clock select signal R180 is the output of NAND gate 1091 when DCC is enabled (signal DCCEN is high), and follows signal QR180 when DCC is disabled (signal DCCEN is low).

When all of the reset state machine control signals are low, flip-flops 1074–1081 are coupled in series, with the last flip-flop 1081 in the series providing clock select signal R270. Flip-flops 1082–1089 are also coupled in series, with the last flip-flop 1089 providing internal signal QR180 (which is used in FIG. 10B). Flip-flops 1071 and 1072 are also coupled in series. Flip-flops 1074 and 1071 are driven by signal QR0BB from FIG. 10A, and flip-flop 1082 is driven by signal R270.

When one or more of the reset state machine control signals are high, the multiplexers of FIG. 10C select appropriate numbers of delays between signal QR0BB (which follows signal R0) and signals QR180 and R270.

When signal DVCC6.5 is high, flip-flop 1074 is driven by the output Q of flip-flop 1072. When signal DV6.75-DVCC4.5 is high and signal DV7.25 is low, flip-flop 1075 is driven by signal QR0BB. When signal DV7.25 is high, flip-flop 1075 is driven by signal QR180. When signal DV5.75 is high and signal DV6.25 is low, flip-flop 1076 is driven by signal QR0BB. When signal DV6.25 is high, flip-flop 1076 is driven by signal QR180. When signal DV4.75 is high and signal DV5.25 is low, flip-flop 1077 is driven by signal QR0BB. When signal DV5.25 is high, flip-flop 1077 is driven by signal QR180.

When signal DVCC7.5-DVCC2.5-DV3.75 is high and signal DV4.25 is low, flip-flop 1078 is driven by signal QR0BB. When signal DV4.25 is high, flip-flop 1078 is driven by signal QR180. When signal DVCC5.5-DV2.75 is high and signal DV3.25 is low, flip-flop 1079 is driven by signal QR0BB. When signal DV3.25 is high, flip-flop 1079 is driven by signal QR180. When signal DVCC7-DVCC3.5-DV1.75 is high and signal DV2.25 is low, flip-flop 1080 is driven by signal QR0BB. When signal DV2.25 is high, flip-flop 1080 is driven by signal QR180.

When signal DVCC3-DVCC1.5-DV1.25 is high and signal R270GND is low, flip-flop 1081 is driven by signal QR180. When signals DVCC 3-DVCC1.5 and R270GND are both high, flip-flop 1081 is driven by signal QR0BB. When signal DVCC3-DVCC1.5 is low and signal R270GND is high, the input D of flip-flop 1081 is tied to ground (GND).

When signal DV7.5-DV3.75 is high, flip-flop 1082 is driven by signal QR0BB.

When signal DV7.25 is high and signal DV6.75-DV5.5-DV3.25 is low, flip-flop 1083 is driven by signal R90. When signals DV6.75 and DV6.75-DV5.5-DV3.25 are both high, flip-flop 1083 is driven by signal R270. When signal DV6.75 is low and signal DV6.75-DV5.5-DV3.25 is high, flip-flop 1083 is driven by signal QR0BB.

When signal DV6.25 is high and signal DV5.75-DV5.5 is low, flip-flop 1084 is driven by signal R90. When signals DV5.75 and DV5.75-DV5.5 are both high, flip-flop 1084 is driven by signal R270. When signal DV5.75 is low and signal DV5.75-DV5.5 is high, flip-flop 1084 is driven by signal QR0BB.

When signal DV5.25 is high and signal DV5.25-DV4.75-DV4.5 is low, flip-flop 1085 is driven by signal R90. When signals DV4.75 and DV5.25-DV4.75-DV4.5 are both high, flip-flop 1085 is driven by signal R270. When signal DV4.75 is low and signal DV5.25-DV4.75-DV4.5 is high, flip-flop 1085 is driven by signal QR0BB.

When signal DV4.25 is high and signal DV3.75-DV3.5 is low, flip-flop 1086 is driven by signal R90. When signals DV3.75 and DV3.75-DV3.5 are both high, flip-flop 1086 is driven by signal R270. When signal DV3.75 is low and signal DV3.75-DV3.5 is high, flip-flop 1086 is driven by signal QR0BB.

When signal DV3.25 is high and signal DV2.75-DV2.5 is low, flip-flop 1087 is driven by signal R90. When signals DV2.75 and DV2.75-DV2.5 are both high, flip-flop 1087 is driven by signal R270. When signal DV2.75 is low and signal DV2.75-DV2.5 is high, flip-flop 1087 is driven by signal QR0BB.

When signal DV2.25 is high and signal DV1.75-DV1.5 is low, flip-flop 1088 is driven by signal R90. When signals DV1.75 and DV1.75-DV1.5 are both high, flip-flop 1088 is driven by signal R270. When signal DV1.75 is low and signal DV1.75-DV1.5 is high, flip-flop 1088 is driven by signal QR0BB.

When signal DV1.25 is high and signal R180GND is low, flip-flop 1089 is driven by signal R90. When signals DVCC5.5 and R180GND are both high, flip-flop 1089 is driven by signal QR0BB. When signal DVCC5.5 is low and signal R180GND is high, the input D of flip-flop 1089 is tied to ground (GND).

Figure 11:
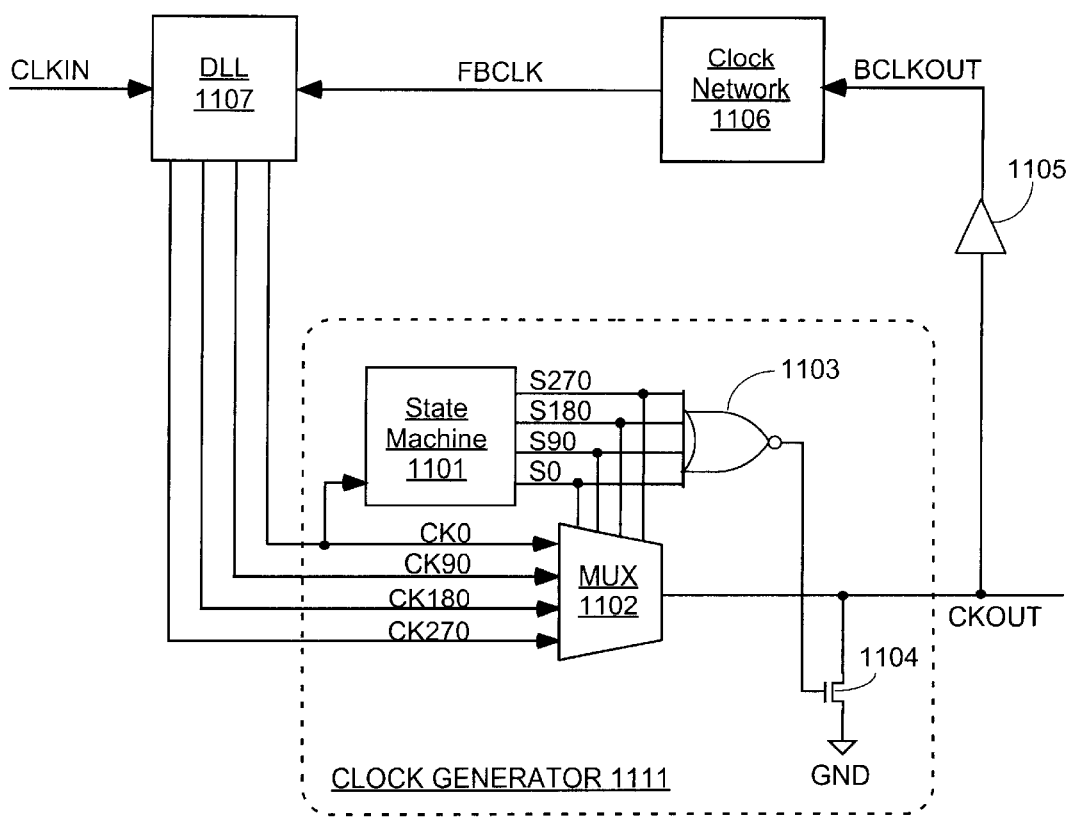
FIG. 11 shows an electronic system including a clock generator circuit according to one embodiment of the invention.

FIG. 11 shows a first electronic system including a clock generator circuit according to one embodiment of the invention. The system of FIG. 11 includes a clock generator circuit 1111, a buffer circuit 1105, a clock network 1106, and a DLL 1107. The clock generator circuit provides an output clock signal CKOUT from four phased input signals CK0, CK90, CK180, and CK270 provided by the DLL.

Clock signal CKOUT is buffered by buffer 1105 to provide buffered clock signal BCLKOUT, which drives clock network 1106. A feedback clock FBCLK from clock network 1106 is provided to DLL 1107 along with a reference clock signal CLKIN. DLL 1107 adds the necessary delay to the feedback clock FBCLK to synchronize the feedback clock signal to reference clock CLKIN, and generates the four phased clock signals CK0, CK90, CK180, C270 synchronized to reference clock CLKIN.

Clock generator circuit 1111 includes state machine circuit 1101, a multiplexer circuit 1102, a NOR circuit 1103, and a pulldown circuit 1104, coupled as shown in FIG. 11 and as previously described (see FIG. 2, for example).

The electronic system of FIG. 11 can be any electronic system. In one embodiment, the system forms a portion of a integrated circuit. In one embodiment, in which the clock generator circuit is programmable as described above, the system includes a programmable logic device (PLD). The user codes are programmed using the configuration data and logic for the PLD.

Figure 12:
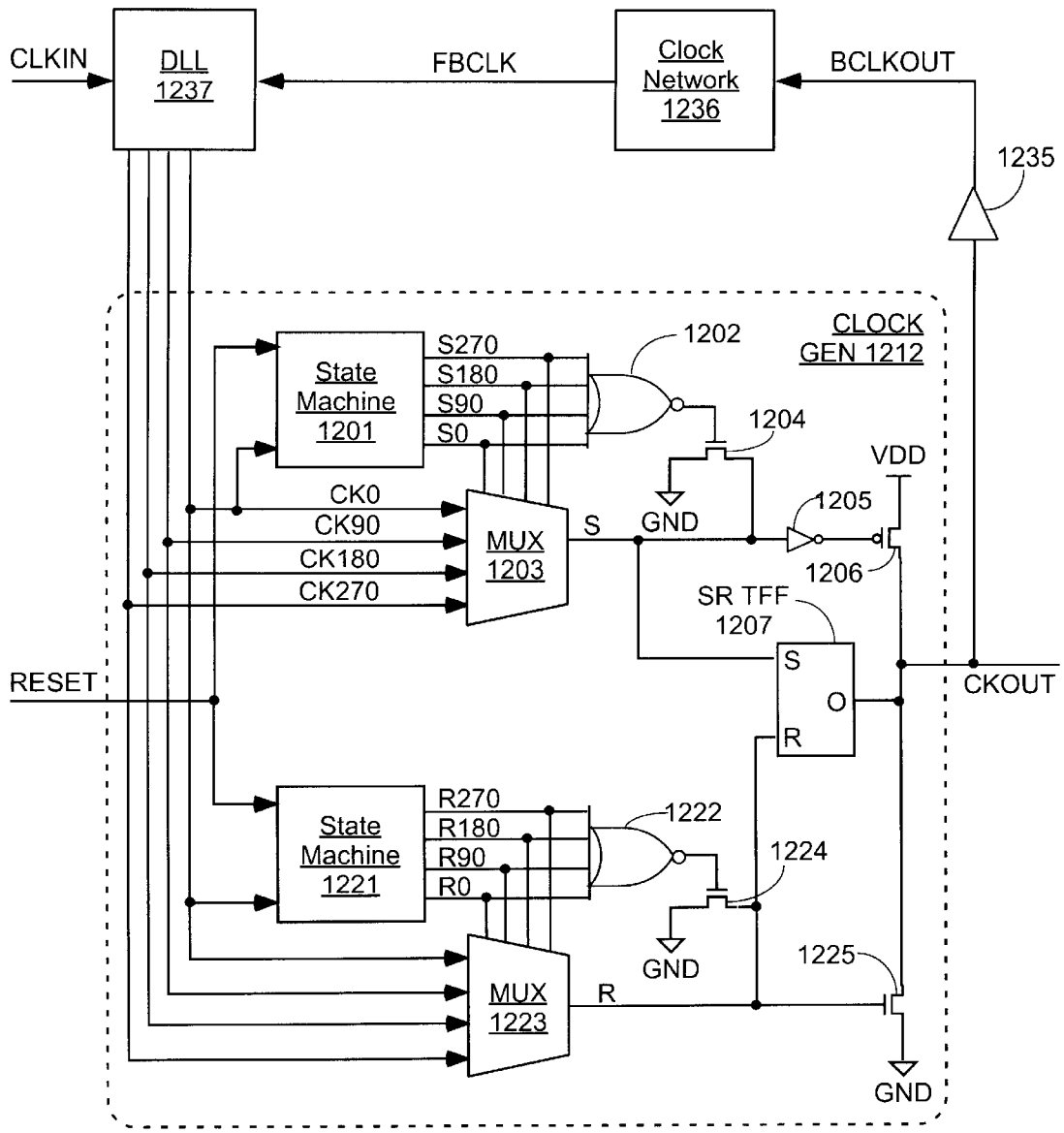
FIG. 12 shows an electronic system including a clock generator circuit according to another embodiment of the invention.

FIG. 12 shows a second electronic system including a clock generator circuit according to another embodiment of the invention. The system of FIG. 12 includes a clock generator circuit 1212, a buffer circuit 1235, a clock network 1236, and a DLL 1237. These elements are coupled together in a similar fashion to those of FIG. 11.

Clock generator circuit 1212 includes state machine circuits 1201 and 1221, multiplexer circuits 1203 and 1223, logical NOR circuits 1202 and 1222, pulldown circuits 1204, 1224, and 1225, keeper circuit 1207, inverter 1205, and pullup circuit 1206. These elements are coupled together in a fashion similar, for example, to those of FIG. 5. In one embodiment, in which the clock generator circuit is programmable as described above, the system includes a programmable logic device (PLD). The user codes are programmed using the configuration data and logic for the PLD.

Those having skill in the relevant arts of the invention will now perceive various modifications and additions that can be made as a result of the disclosure herein. For example, NOR circuits, NOR gates, pullup circuits, pulldown circuits, pullups, pulldowns, multiplexer circuits, multiplexers, transistors, P-channel transistors, N-channel transistors, passgates, state machine circuits, state machines, decoder circuits, decoders, DLLs, clock networks, buffers, and other components other than those described herein can be used to implement the invention. Active-high signals can be replaced with active-low signals and vice versa by making straightforward alterations to the circuitry, such as are well known in the art of circuit design.

Moreover, some components are shown directly connected to one another while others are shown connected via intermediate components. In each instance the method of interconnection establishes some desired electrical communication between two or more circuit nodes. Such communication can often be accomplished using a number of circuit configurations, as will be understood by those of skill in the art.

Accordingly, all such modifications and additions are deemed to be within the scope of the invention, which is to be limited only by the appended claims and their equivalents.

What is claimed is:

1. A clock generator circuit, comprising:
   a plurality of phased input clock terminals including a first input clock terminal;
   a clock output terminal;
   a state machine circuit having an input terminal coupled to the first input clock terminal and a plurality of output terminals;
   a logical NOR circuit having input terminals coupled to the output terminals of the state machine circuit and further having an output terminal;
   a multiplexer circuit having data input terminals coupled to the plurality of phased input clock terminals, select input terminals coupled to the output terminals of the state machine circuit, and an output terminal coupled to the clock output terminal; and
   a pulldown circuit coupled to the clock output terminal, the pulldown circuit having a control terminal coupled to the output terminal of the logical NOR circuit.

2. The clock generator circuit of claim 1, further comprising a phase shift circuit coupled between the first input clock terminal and the state machine circuit, and further coupled between the plurality of phased input clock terminals and the data input terminals of the multiplexer circuit.

3. The clock generator circuit of claim 1, further comprising:
   a plurality of user code input terminals; and
   a decoder circuit having input terminals coupled to the user code input terminals and output terminals coupled to control input terminals of the state machine circuit.

4. The clock generator circuit of claim 1, wherein the logical NOR circuit comprises a NOR gate.

5. The clock generator circuit of claim 1, wherein the pulldown circuit comprises an N-channel transistor coupled between the clock output terminal and a ground.

6. The clock generator circuit of claim 1, wherein:
   the multiplexer circuit comprises, for each data input terminal, a passgate coupled between the data input terminal and the output terminal of the multiplexer circuit; and
   each of the passgates has a gate terminal coupled to one of the select input terminals of the multiplexer circuit.

7. The clock generator circuit of claim 1, wherein the plurality of phased input clock terminals includes exactly four phased input clock terminals.

8. A clock generator circuit, comprising:
   a plurality of phased input clock terminals including a first input clock terminal;
   a clock output terminal;
   first and second nodes;
   a first state machine circuit having an input terminal coupled to the first input clock terminal and further having a plurality of output terminals;
   a first logical NOR circuit having input terminals coupled to the output terminals of the first state machine circuit and further having an output terminal;
   a first multiplexer circuit having data input terminals coupled to the plurality of phased input clock terminals, select input terminals coupled to the output terminals of the first state machine circuit, and an output terminal coupled to the first node;
   a first pulldown circuit coupled to the first node, the pulldown circuit having a control terminal coupled to the output terminal of the first logical NOR circuit;
   a second state machine circuit having an input terminal coupled to the first input clock terminal and further having a plurality of output terminals;
   a second logical NOR circuit having input terminals coupled to the output terminals of the second state machine circuit and further having an output terminal;
   a second multiplexer circuit having data input terminals coupled to the plurality of phased input clock terminals, select input terminals coupled to the output terminals of the second state machine circuit, and an output terminal coupled to the second node;
   a second pulldown circuit coupled to the second node, the pulldown circuit having a control terminal coupled to the output terminal of the second logical NOR circuit;
   a pullup circuit coupled to the clock output terminal and having a control terminal coupled to the first node;
   a third pulldown circuit coupled to the clock output terminal and having a control terminal coupled to the second node; and
   a keeper circuit having first and second input terminals coupled to the first and second nodes, respectively, and an output terminal coupled to the clock output terminal.

9. The clock generator circuit of claim 8, wherein the pullup circuit comprises:
   a P-channel transistor coupled between the clock output terminal and a power high and having a gate terminal; and
   an inverter having an input terminal coupled to the first node and an output terminal coupled to the gate terminal of the P-channel transistor.

10. The clock generator circuit of claim 8, wherein the third pulldown circuit comprises:
    an N-channel transistor coupled between the clock output terminal and a ground and having a gate terminal coupled to the second node.

11. The clock generator circuit of claim 8, wherein the keeper circuit comprises a latch having a set terminal coupled to the first node and a reset terminal coupled to the second node.

12. The clock generator circuit of claim 8, further comprising a phase shift circuit coupled between the first input clock terminal and the first and second state machine circuits, and further coupled between the plurality of phased input clock terminals and the data input terminals of the first and second multiplexer circuits.

13. The clock generator circuit of claim 8, further comprising:
    a plurality of user code input terminals;
    a first decoder circuit having input terminals coupled to the user code input terminals and output terminals coupled to control input terminals of the first state machine circuit; and
    a second decoder circuit having input terminals coupled to the user code input terminals and output terminals coupled to control input terminals of the second state machine circuit.

14. The clock generator circuit of claim 8, further comprising:
    a duty cycle enable terminal coupled to the second state machine circuit;
    a first multiplexer coupled between the first node and the pullup circuit, the first multiplexer having a data input terminal coupled to at least one of the plurality of phased input clock terminals and a select terminal coupled to the duty cycle enable terminal; and
    a second multiplexer coupled between the second node and the third pulldown circuit, the second multiplexer having a data input terminal coupled to at least another one of the plurality of phased input clock terminals and a select terminal coupled to the duty cycle enable terminal.

15. The clock generator circuit of claim 8, wherein the logical NOR circuit comprises a NOR gate.

16. The clock generator circuit of claim 8, wherein the third pulldown circuit comprises an N-channel transistor coupled between the clock output terminal and a ground.

17. The clock generator circuit of claim 8, wherein:
    the first and second multiplexer circuits each comprise, for each data input terminal, a passgate coupled between the data input terminal and the output terminal of the corresponding multiplexer circuit; and
    each of the passgates in each multiplexer circuit has a gate terminal coupled to one of the select input terminals of the corresponding multiplexer circuit.

18. The clock generator circuit of claim 8, wherein the plurality of phased input clock terminals includes exactly four phased input clock terminals.

19. The clock generator circuit of claim 8, wherein the first and second state machine circuits comprise a single state machine.

20. The clock generator circuit of claim 13, wherein the first and second decoder circuits comprise a single decoder.

21. An electronic system, comprising:
   a delay-lock loop (DLL) having a clock input terminal, a feedback input terminal, and a plurality of phased output terminals;
   a clock network having an output terminal coupled to the feedback input terminal of the DLL and further having an input terminal; and
   a clock generator circuit, comprising:
      a plurality of phased input clock terminals coupled to the phased output terminals of the DLL, the plurality of phased input clock terminals including a first input clock terminal;
      a clock output terminal coupled to the input terminal of the clock network;
      a state machine circuit having an input terminal coupled to the first input clock terminal and a plurality of output terminals;
      a logical NOR circuit having input terminals coupled to the output terminals of the state machine circuit and further having an output terminal;
      a multiplexer circuit having data input terminals coupled to the plurality of phased input clock terminals, select input terminals coupled to the output terminals of the state machine circuit, and an output terminal coupled to the clock output terminal; and
      a pulldown circuit coupled to the clock output terminal, the pulldown circuit having a control terminal coupled to the output terminal of the logical NOR circuit.

22. The electronic system of claim 21, wherein the clock generator circuit further comprises a phase shift circuit coupled between the first input clock terminal and the state machine circuit, and further coupled between the plurality of phased input clock terminals and the data input terminals of the multiplexer circuit.

23. The electronic system of claim 21, wherein the clock generator circuit further comprises:
   a plurality of user code input terminals; and
   a decoder circuit having input terminals coupled to the user code input terminals and output terminals coupled to control input terminals of the state machine circuit.

24. The electronic system of claim 23, wherein the system comprises at least a portion of a programmable logic device (PLD), and the user code input terminals are coupled to receive configuration data for the PLD.

25. An electronic system, comprising:
   a delay-lock loop (DLL) having a clock input terminal, a feedback input terminal, and a plurality of phased output terminals;
   a clock network having an output terminal coupled to the feedback input terminal of the DLL and further having an input terminal; and
   a clock generator circuit, comprising:
      a plurality of phased input clock terminals coupled to the phased output terminals of the DLL, the plurality of phased input clock terminals including a first input clock terminal;
      a clock output terminal coupled to the input terminal of the clock network;
      first and second nodes;
      a first state machine circuit having an input terminal coupled to the first input clock terminal and further having a plurality of output terminals;
      a first logical NOR circuit having input terminals coupled to the output terminals of the first state machine circuit and further having an output terminal;
      a first multiplexer circuit having data input terminals coupled to the plurality of phased input clock terminals, select input terminals coupled to the output terminals of the first state machine circuit, and an output terminal coupled to the first node;
      a first pulldown circuit coupled to the first node, the pulldown circuit having a control terminal coupled to the output terminal of the first logical NOR circuit;
      a second state machine circuit having an input terminal coupled to the first input clock terminal and further having a plurality of output terminals;
      a second logical NOR circuit having input terminals coupled to the output terminals of the second state machine circuit and further having an output terminal;
      a second multiplexer circuit having data input terminals coupled to the plurality of phased input clock terminals, select input terminals coupled to the output terminals of the second state machine circuit, and an output terminal coupled to the second node;
      a second pulldown circuit coupled to the second node, the pulldown circuit having a control terminal coupled to the output terminal of the second logical NOR circuit;
      a pullup circuit coupled to the clock output terminal and having a control terminal coupled to the first node;
      a third pulldown circuit coupled to the clock output terminal and having a control terminal coupled to the second node; and
      a keeper circuit having first and second input terminals coupled to the first and second nodes, respectively, and an output terminal coupled to the clock output terminal.

26. The electronic system of claim 25, wherein the clock generator circuit further comprises a phase shift circuit coupled between the first input clock terminal and the first and second state machine circuits, and further coupled between the plurality of phased input clock terminals and the data input terminals of the first and second multiplexer circuits.

27. The electronic system of claim 25, wherein the clock generator circuit further comprises:
   a plurality of user code input terminals;
   a first decoder circuit having input terminals coupled to the user code input terminals and output terminals coupled to control input terminals of the first state machine circuit; and
   a second decoder circuit having input terminals coupled to the user code input terminals and output terminals coupled to control input terminals of the second state machine circuit.

28. The electronic system of claim 27, wherein the system comprises at least a portion of a programmable logic device (PLD), and the user code input terminals are coupled to receive configuration data for the PLD.

29. The electronic system of claim 25, wherein the clock generator circuit further comprises:
   a duty cycle enable terminal coupled to the second state machine circuit;

a first multiplexer coupled between the first node and the pullup circuit, the first multiplexer having a data input terminal coupled to at least one of the plurality of phased input clock terminals and a select terminal coupled to the duty cycle enable terminal; and a second multiplexer coupled between the second node and the third pulldown circuit, the second multiplexer having a data input terminal coupled to at least another one of the plurality of phased input clock terminals and a select terminal coupled to the duty cycle enable terminal.

* * * * *